United States Patent
Ivanov

(10) Patent No.: US 11,232,582 B2
(45) Date of Patent: Jan. 25, 2022

(54) VISUAL LOCALIZATION USING A THREE-DIMENSIONAL MODEL AND IMAGE SEGMENTATION

(71) Applicant: HERE Global B.V., Eindhoven (NL)

(72) Inventor: Pavel Ivanov, Tampere (FI)

(73) Assignee: HERE Global B.V., Eindhoven (NL)

( * ) Notice: Subject to any disclaimer, the term of this patent is extended or adjusted under 35 U.S.C. 154(b) by 78 days.

(21) Appl. No.: 16/853,906

(22) Filed: Apr. 21, 2020

(65) Prior Publication Data
US 2021/0327084 A1 Oct. 21, 2021

(51) Int. Cl.
*G06T 1/00* (2006.01)
*G06T 7/70* (2017.01)
(Continued)

(52) U.S. Cl.
CPC .............. *G06T 7/70* (2017.01); *G01C 21/28* (2013.01); *G06F 17/16* (2013.01); *G06T 17/05* (2013.01); *H04W 4/021* (2013.01)

(58) Field of Classification Search
CPC .. H04N 5/2396; H04N 1/00145; G06T 19/20; G06T 19/006; G06F 17/3028; G06F 30/12; G06F 16/74; G06F 16/5854; G06N 3/08; G06Q 30/0633; G06Q 30/0631; G06K 9/00214
See application file for complete search history.

(56) References Cited

U.S. PATENT DOCUMENTS 9,799,139 B2 10/2017 Sievert et al.
2016/0334877 A1* 11/2016 Yousefi .................. G06F 3/017
(Continued)

FOREIGN PATENT DOCUMENTS

WO   WO 2018/104563 A2   6/2018

OTHER PUBLICATIONS

Armagan, A., et al., "Learning to Align Semantic Segmentation and 2.5D Maps for Geolocalization", Proceedings of the IEEE Conference on Computer Vision and Pattern Recognition (CVPR), Jul. 21, 2017 to Jul. 26, 2017, 8 pages, retrieved from https://www.labri.fr/perso/vlepetit/pubs/annagan_cvpr17.pdf on Dec. 19, 2019.
(Continued)

*Primary Examiner* — Phuoc H Doan
(74) *Attorney, Agent, or Firm* — Alston & Bird LLP

(57) ABSTRACT

An apparatus receives a first image captured by an image capture device of a mobile apparatus. The first image corresponds to surroundings of the mobile apparatus. Each artificial image of a first plurality of artificial images respectively is a two-dimensional projection of a three-dimensional model from a perspective of an image position and image pose. The apparatus determines one or more first image attributes respectively for one or more sections of the first image; identifies at least one artificial image of the first plurality of artificial images that has one or more artificial image attributes that substantially match the one or more first image attributes for corresponding sections of the at least one artificial image and the first image; and determines a location and/or pose of the mobile apparatus based at least in part on the image position and/or the image pose associated with the at least one artificial image.

20 Claims, 9 Drawing Sheets

(51) Int. Cl.
*H04W 4/021* (2018.01)
*G06F 17/16* (2006.01)
*G06T 17/05* (2011.01)
*G01C 21/28* (2006.01)

(56) References Cited

U.S. PATENT DOCUMENTS

| | | |
|---|---|---|
| 2017/0116723 A1 | 4/2017 | Aughey |
| 2018/0165831 A1 | 6/2018 | Kwant et al. |
| 2019/0051014 A1 | 2/2019 | Kahle et al. |
| 2021/0104014 A1* | 4/2021 | Kolb, V ................. G06T 5/003 |

OTHER PUBLICATIONS

Wang, P., et al., "Dels-3d: Deep Localization and Segmentation with a 3d Semantic Map", National Engineering Laboratory for Deep Learning Technology and Applications, May 13, 2018, 10 pages, retrieved from https://arxiv.org/pdf/1805.04949.pdf on Dec. 19, 2019.

Wolcott, W., et al., "Visual Localization Within Lidar Maps for Automated Urban Driving", IEEE International Conference on Intelligent Robots and Systems, Oct. 31, 2014, pp. 176-183, retrieved from http://robots.engin.umich.edu/~rwolcott/uploads/rwolcott-2014a.pdf on Dec. 19, 2019.

Extended European Search Report for European Application No. 21168870.0 dated Oct. 1, 2021, 7 pages.

* cited by examiner

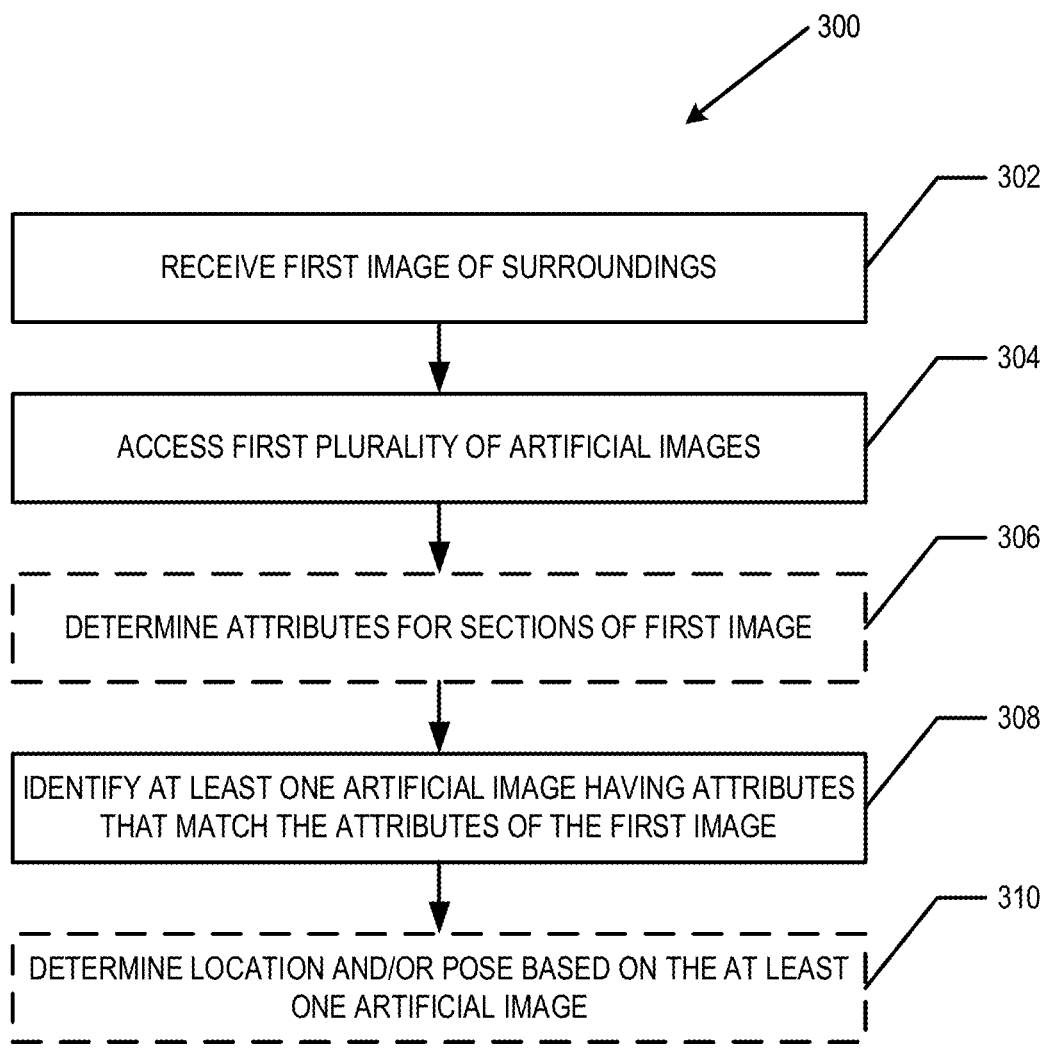

FIG. 8
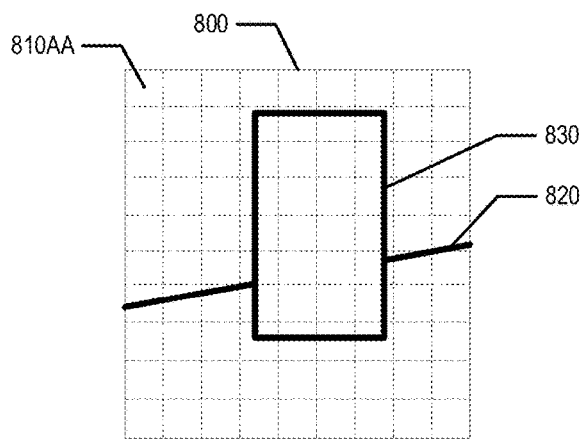
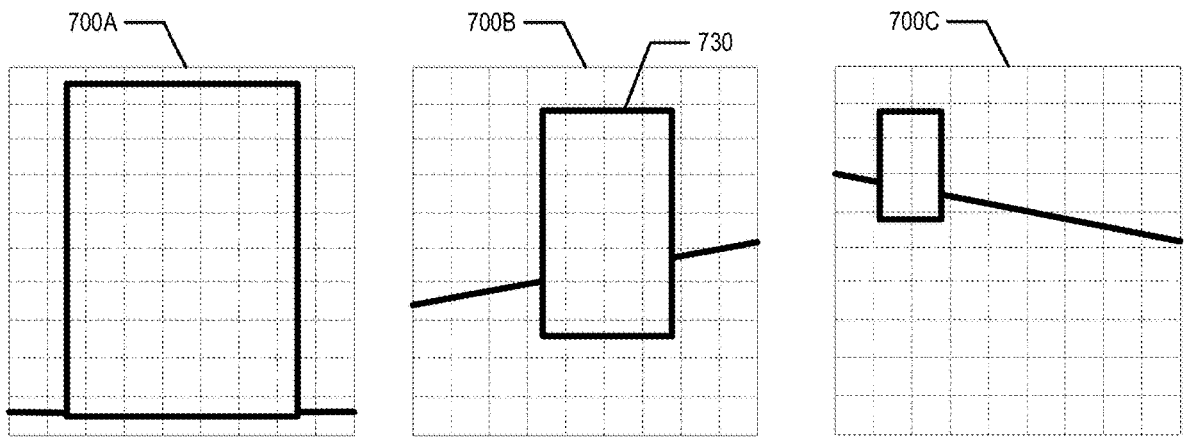
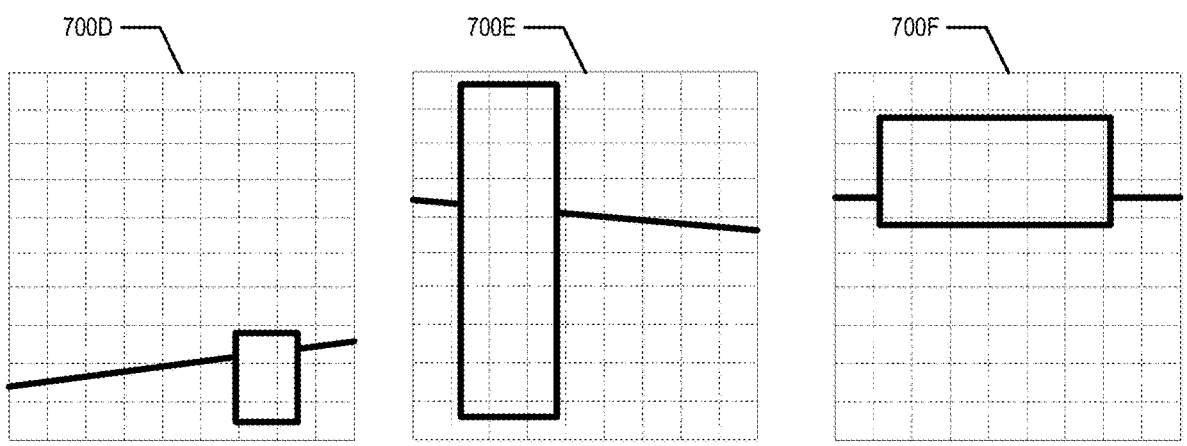

VISUAL LOCALIZATION USING A THREE-DIMENSIONAL MODEL AND IMAGE SEGMENTATION

TECHNOLOGICAL FIELD

An example embodiment relates generally to localization. In particular, an example embodiment generally relates to visual localization using a three-dimensional model and image segmentation.

BACKGROUND

Autonomous driving, for example, requires high accuracy, real-time localization of vehicles. Pedestrian navigation, especially in dense urban environments, also relies upon receiving precise real-time location data. Currently, most navigation has been accomplished using a global positioning system (GPS), which provides a real-time location with a 95% confidence interval of 7.8 meters, according to the US government. However, in complicated urban environments, reflection or obstruction of GPS signals by tall buildings and other structures can further increase this error, such that a determined location may be off by as much as 30 meters (also known as multipath error). In an autonomous driving example occurring in a large city, this accuracy is not sufficient to properly localize an autonomous vehicle so that it can make safe route planning decisions, given that the width of many lanes is only 3 to 4 meters. City blocks typically extend around 80 meters, thus this error in GPS localization could mean the difference of almost half of a block. Local device sensors, such as inertial measurement units (IMUs) can increase the accuracy of localization by taking into account movement, but these sensors tend to drift and still do not provide sufficient accuracy for localization. Navigation in indoor environments is even more unreliable due to the even greater obstruction of GPS signals. Furthermore, navigation relies on GPS signals for positioning, hence the positioning system name, but typically count on local device sensors for orientation (pose), which again may drift or simply be inaccurate. Therefore, there is a widely recognized need for accuracy for position and pose data across many industries, a significant example being autonomous driving.

Visual-based localization methods have been contemplated as an alternative and/or a supplement to GPS navigation in some environments due to the ability of visual-based localization methods to achieve high accuracy of localization. Current visual localization methods rely on a database of geo-tagged visual features, thereby requiring a visual survey of the area of interest before localization can be done. As such, an obvious barrier to ubiquitous implementation of visual-based localization methods is scalability, especially on a global scale, as an incredibly large database would be required to store data on a large number of geo-tagged visual features. Even following implementation of a large visual features database, most if not all localization methods can only be implemented on the server side as a network-centric architecture, due to client devices exhibiting constraints in data storage capacity and/or computational power. Thus, a visual-based localization method that provides at least the same or more accuracy as GPS navigation, that can also be relatively portable in use by client devices would be an improvement over current methods and is desirable.

BRIEF SUMMARY

At least some example embodiments allow for an accurate, real time (or near real time) determination of a location and/or pose of a mobile apparatus. In particular, methods, apparatus, and computer program products are provided in accordance with an example embodiment in order to provide accurate, real time (or near real time) determinations of a mobile apparatus's position and/or pose. In certain embodiments, a first image is captured by an image capturing device that is part of and/or in communication and co-located with the mobile apparatus. A first plurality of artificial images are generated and/or accessed. In various embodiments, an artificial image is generated by creating a two-dimensional projection of a three-dimensional object from an image position and image pose. The artificial images are processed and/or analyzed to determine an attribute for sections of the artificial images. The first image may also be processed and/or analyzed to determine an attribute for sections of the first image. In various embodiments, the attributes may correspond to a color or color classification of a section, a texture or texture classification of a section, a class (e.g., building, sky, road surface, ground, other) of a feature shown in the section, and/or other attribute. In an example embodiment, a section of an image is a pixel, a group of pixels, and/or a group of contiguous pixels. Based on a comparison of the attributes of sections of the artificial images and the attributes of corresponding sections of the first image, at least one artificial image is identified. In various embodiments, the at least one artificial image is identified as having one or more attributes that substantially match one or more attributes of the first image for corresponding sections of the at least one artificial image and the first image. The location and/or the pose of the mobile apparatus is then determined based on the image position and image pose corresponding to the at least one artificial image.

In an example embodiment, the identified at least one artificial image is two or more artificial images and the location and/or pose of the mobile apparatus is determined based on the image positions and image poses corresponding to the two or more artificial images. In an example embodiment, a weight may be determined for each of the two or more artificial images based on a respective level with which the attributes of the artificial image match the attributes of the first image in corresponding sections. In an example embodiment, a second plurality of artificial images are generated and/or accessed based on the identified at least one artificial image and the artificial images of the second plurality of artificial images may be processed and/or analyzed such that a second at least one artificial image is selected from the second plurality of artificial images based on the second at least one artificial image having attributes that substantially match the attributes of the first image in corresponding sections.

In an example embodiment, an apparatus (e.g., a mobile apparatus or a remote apparatus) receives a first image captured by an image capture device of a mobile apparatus. The first image corresponds to the surroundings of the mobile apparatus. A first plurality of artificial images are accessible to the processor of the apparatus. Each artificial image of the first plurality of artificial images respectively is a two-dimensional projection of a three-dimensional model from a perspective of an image position and image pose. The apparatus determines one or more first image attributes respectively for one or more sections of the first image. The apparatus identifies at least one artificial image of the first plurality of artificial images that has one or more artificial image attributes that substantially match the one or more first image attributes for corresponding sections of the at least one artificial image and the first image. The apparatus determines a location and/or pose of the mobile apparatus based at least in part on the image position and/or the image pose associated with the identified at least one artificial image.

In accordance with an aspect of the present disclosure, a method for determining the location and/or pose of a mobile apparatus. In an example embodiment, the method comprises receiving, by a processor, a first image captured by an image capture device of a mobile apparatus, the first image corresponding to surroundings of the mobile apparatus. A first plurality of artificial images are accessible to the processor. Each artificial image of the first plurality of artificial images respectively is a two-dimensional projection of a three-dimensional model from a perspective of an image position and image pose. The method further comprises determining, by the processor, one or more first image attributes respectively for one or more sections of the first image. The method further comprises identifying, by the processor, at least one artificial image of the first plurality of artificial images having one or more artificial image attributes that substantially match the one or more first image attributes for corresponding sections of the at least one artificial image and the first image. The method further comprises determining, by the processor, a location and/or pose of the mobile apparatus based at least in part on the image position and/or the image pose associated with the identified at least one artificial image.

In an example embodiment, the method further comprises receiving an estimated position of the mobile apparatus determined by a location sensor of the mobile apparatus; and identifying or causing identification of the first plurality of artificial images based on artificial images of the first plurality of artificial images having respective image positions that are within a first distance threshold of the estimated position of the mobile apparatus. In an example embodiment, the first image attribute determined for a section of the first image corresponds to a type of feature in the section of the first image and an artificial image attribute determined for a section of an artificial image of the first plurality of artificial images corresponds to a type of feature in the section of the artificial image. In an example embodiment, the first image attribute determined for a section of the first image corresponds to a color of the section of the first image and an artificial image attribute determined for a section of an artificial image of the first plurality of artificial images corresponds to a color of the section of the artificial image. In an example embodiment, the at least one artificial image comprises a set of artificial images selected from the first plurality of artificial images, and determining a location of the mobile apparatus comprises assigning a weight to each artificial image of the set of artificial images based at least in part on a matching score indicating a level of match between first image attributes and artificial image attributes of the artificial image, and wherein the location of the mobile apparatus is determined based on the image position and/or the image pose and weight associated with each artificial image of the set of artificial images. In an example embodiment, determining a location of the mobile apparatus comprises normalizing the image position and/or the image pose of each artificial image of the set of artificial images based at least in part on the weight assigned to the artificial image; and calculating a probabilistic location of the mobile apparatus based on the normalized position and/or pose of each of the selected second plurality of artificial images.

In an example embodiment, the method further comprises accessing a second plurality of artificial images based on the at least one artificial image; and determining a second at least one artificial image from the second plurality of artificial images, the second at least one artificial image having artificial image attributes that substantially match the first image attributes for corresponding sections of the second at least one artificial image and the first image. In an example embodiment, the three-dimensional model is a three-dimensional vector model. In an example embodiment, the method further comprises providing the location and/or pose of the mobile apparatus for use in performing a navigation function. In an example embodiment, the method further comprises receiving, by the apparatus, radio probe data, wherein the location and/or pose of the mobile apparatus is provided as a georeference for the radio probe data. In an example embodiment, the method further comprises at least one of (a) accessing at least a portion of the first plurality of artificial images from memory, (b) generating at least a portion of the first plurality of artificial images based at least in part on data of the three-dimensional model, (c) or receiving at least a portion of the first plurality of artificial images.

In accordance with another aspect of the present disclosure, an apparatus configured to determine the location and/or pose of a mobile apparatus is provided. In an example embodiment, the apparatus comprises at least one processor and at least one memory storing computer program code. The at least one memory and the computer program code are configured to, with the processor, cause the apparatus to at least receive a first image captured by an image capture device of a mobile apparatus. The first image corresponds to the surroundings of the mobile apparatus. A first plurality of artificial images are accessible to the processor. Each artificial image of the first plurality of artificial images respectively is a two-dimensional projection of a three-dimensional model from a perspective of an image position and image pose. The at least one memory and the computer program code are further configured to, with the processor, cause the apparatus to at least determine one or more first image attributes respectively for one or more sections of the first image; identify at least one artificial image of the first plurality of artificial images having one or more artificial image attributes that substantially match the one or more first image attributes for corresponding sections of the at least one artificial image and the first image; and determine a location and/or pose of the mobile apparatus based at least in part on the image position and/or the image pose associated with the identified at least one artificial image.

In an example embodiment, the at least one memory and the computer program code are further configured to, with the processor, cause the apparatus to at least receive an estimated position of the mobile apparatus determined by a location sensor of the mobile apparatus; and identify or causing identification of the first plurality of artificial images based on artificial images of the first plurality of artificial images having respective image positions that are within a first distance threshold of the estimated position of the mobile apparatus. In an example embodiment, the first image attribute determined for a section of the first image corresponds to a type of feature in the section of the first image and an artificial image attribute determined for a section of an artificial image of the first plurality of artificial images corresponds to a type of feature in the section of the artificial image. In an example embodiment, the first image attribute determined for a section of the first image corresponds to a color of the section of the first image and an artificial image attribute determined for a section of an artificial image of the first plurality of artificial images corresponds to a color of the section of the artificial image. In an example embodiment, the at least one artificial image comprises a set of artificial images selected from the first plurality of artificial images, and determining a location of the mobile apparatus comprises assigning a weight to each artificial image of the set of artificial images based at least in part on a matching score indicating a level of match between first image attributes and artificial image attributes of the artificial image, and wherein the location of the mobile apparatus is determined based on the image position and/or the image pose and weight associated with each artificial image of the set of artificial images. In an example embodiment, determining a location of the mobile apparatus comprises normalizing the image position and/or the image pose of each artificial image of the set of artificial images based at least in part on the weight assigned to the artificial image; and calculating a probabilistic location of the mobile apparatus based on the normalized position and/or pose of each of the selected second plurality of artificial images.

In an example embodiment, the at least one memory and the computer program code are further configured to, with the processor, cause the apparatus to at least access a second plurality of artificial images based on the at least one artificial image; and determine a second at least one artificial image from the second plurality of artificial images, the second at least one artificial image having artificial image attributes that substantially match the first image attributes for corresponding sections of the second at least one artificial image and the first image. In an example embodiment, the three-dimensional model is a three-dimensional vector model. In an example embodiment, the at least one memory and the computer program code are further configured to, with the processor, cause the apparatus to at least provide the location and/or pose of the mobile apparatus for use in performing a navigation function. In an example embodiment, the at least one memory and the computer program code are further configured to, with the processor, cause the apparatus to at least receive radio probe data, wherein the location and/or pose of the mobile apparatus is provided as a georeference for the radio probe data. In an example embodiment, the at least one memory and the computer program code are further configured to, with the processor, cause the apparatus to perform at least one of (a) access at least a portion of the first plurality of artificial images from memory, (b) generate at least a portion of the first plurality of artificial images based at least in part on data of the three-dimensional model, (c) or receive at least a portion of the first plurality of artificial images.

In accordance with an example embodiment, a computer program product is provided that comprises at least one non-transitory computer-readable storage medium having computer-executable program code instructions stored therein. The computer-executable program code instructions comprise program code instructions configured to, when executed by a processor of an apparatus, cause the apparatus to receive a first image captured by an image capture device of a mobile apparatus. The first image corresponds to the surroundings of the mobile apparatus. A first plurality of artificial images are accessible to the processor. Each artificial image of the first plurality of artificial images respectively is a two-dimensional projection of a three-dimensional model from a perspective of an image position and image pose. The computer-executable program code instructions further comprise program code instructions configured to, when executed by a processor of an apparatus, cause the apparatus to determine one or more first image attributes respectively for one or more sections of the first image; identify at least one artificial image of the first plurality of artificial images having one or more artificial image attributes that substantially match the one or more first image attributes for corresponding sections of the at least one artificial image and the first image; and determine a location and/or pose of the mobile apparatus based at least in part on the image position and/or the image pose associated with the identified at least one artificial image.

In an example embodiment, the computer-executable program code instructions further comprise program code instructions configured to, when executed by a processor of an apparatus, cause the apparatus to receive an estimated position of the mobile apparatus determined by a location sensor of the mobile apparatus; and identify or causing identification of the first plurality of artificial images based on artificial images of the first plurality of artificial images having respective image positions that are within a first distance threshold of the estimated position of the mobile apparatus. In an example embodiment, the first image attribute determined for a section of the first image corresponds to a type of feature in the section of the first image and an artificial image attribute determined for a section of an artificial image of the first plurality of artificial images corresponds to a type of feature in the section of the artificial image. In an example embodiment, the first image attribute determined for a section of the first image corresponds to a color of the section of the first image and an artificial image attribute determined for a section of an artificial image of the first plurality of artificial images corresponds to a color of the section of the artificial image. In an example embodiment, the at least one artificial image comprises a set of artificial images selected from the first plurality of artificial images, and determining a location of the mobile apparatus comprises assigning a weight to each artificial image of the set of artificial images based at least in part on a matching score indicating a level of match between first image attributes and artificial image attributes of the artificial image, and wherein the location of the mobile apparatus is determined based on the image position and/or the image pose and weight associated with each artificial image of the set of artificial images. In an example embodiment, determining a location of the mobile apparatus comprises normalizing the image position and/or the image pose of each artificial image of the set of artificial images based at least in part on the weight assigned to the artificial image; and calculating a probabilistic location of the mobile apparatus based on the normalized position and/or pose of each of the selected second plurality of artificial images.

In an example embodiment, the computer-executable program code instructions further comprise program code instructions configured to, when executed by a processor of an apparatus, cause the apparatus to access a second plurality of artificial images based on the at least one artificial image; and determine a second at least one artificial image from the second plurality of artificial images, the second at least one artificial image having artificial image attributes that substantially match the first image attributes for corresponding sections of the second at least one artificial image and the first image. In an example embodiment, the three-dimensional model is a three-dimensional vector model. In an example embodiment, the computer-executable program code instructions further comprise program code instructions configured to, when executed by a processor of an apparatus, cause the apparatus to provide the location and/or pose of the mobile apparatus for use in performing a navigation function. In an example embodiment, the computer-executable program code instructions further comprise program code instructions configured to, when executed by a processor of an apparatus, cause the apparatus to receive radio probe data, wherein the location and/or pose of the mobile apparatus is provided as a georeference for the radio probe data. In an example embodiment, computer-executable program code instructions further comprise program code instructions configured to, when executed by a processor of an apparatus, cause the apparatus to perform at least one of (a) access at least a portion of the first plurality of artificial images from memory, (b) generate at least a portion of the first plurality of artificial images based at least in part on data of the three-dimensional model, (c) or receive at least a portion of the first plurality of artificial images.

In accordance with yet another aspect of the present disclosure, an apparatus is provided that comprises means for receiving a first image captured by an image capture device of a mobile apparatus. The first image corresponds to the surroundings of the mobile apparatus. A first plurality of artificial images are accessible to the apparatus. Each artificial image of the first plurality of artificial images respectively is a two-dimensional projection of a three-dimensional model from a perspective of an image position and image pose. The apparatus comprises means for determining one or more first image attributes respectively for one or more sections of the first image. The apparatus comprises means for identifying at least one artificial image of the first plurality of artificial images having one or more artificial image attributes that substantially match the one or more first image attributes for corresponding sections of the at least one artificial image and the first image. The apparatus comprises means for determining a location and/or pose of the mobile apparatus based at least in part on the image position and/or the image pose associated with the identified at least one artificial image.

BRIEF DESCRIPTION OF THE DRAWINGS

Figure 1:
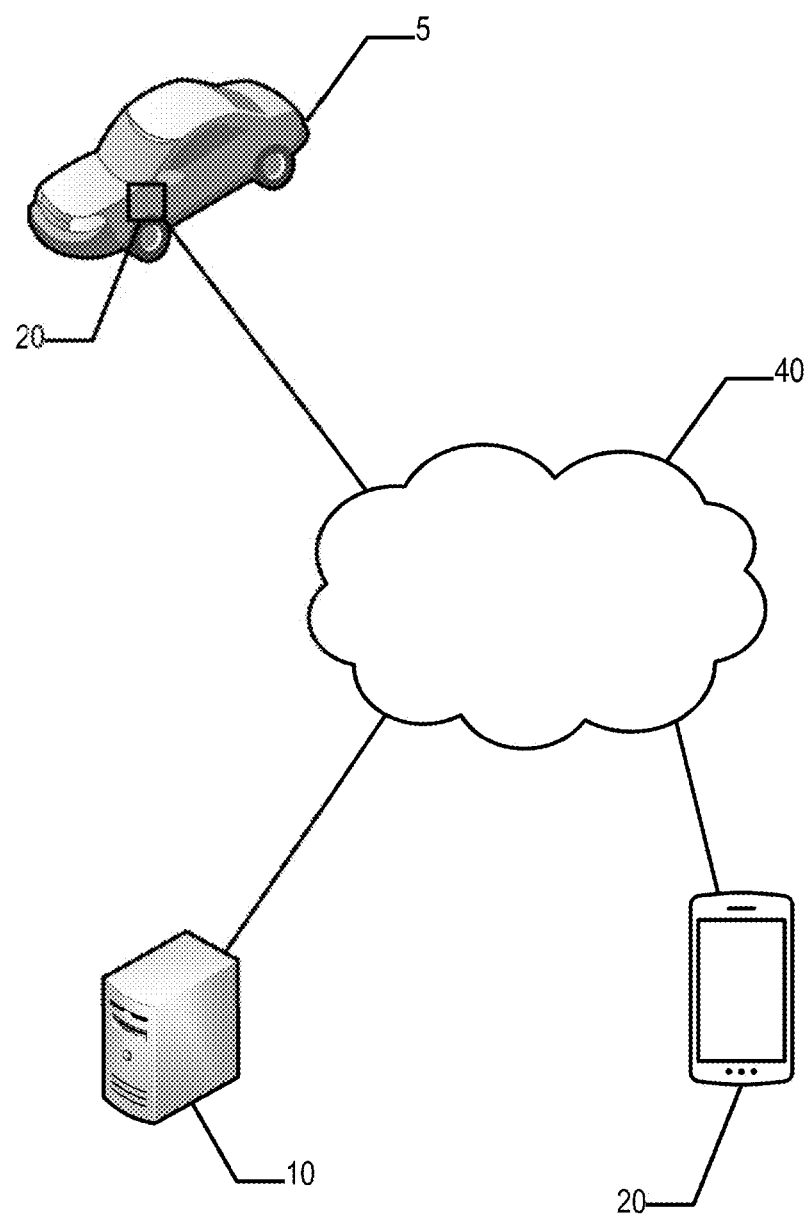
Figure 2A:
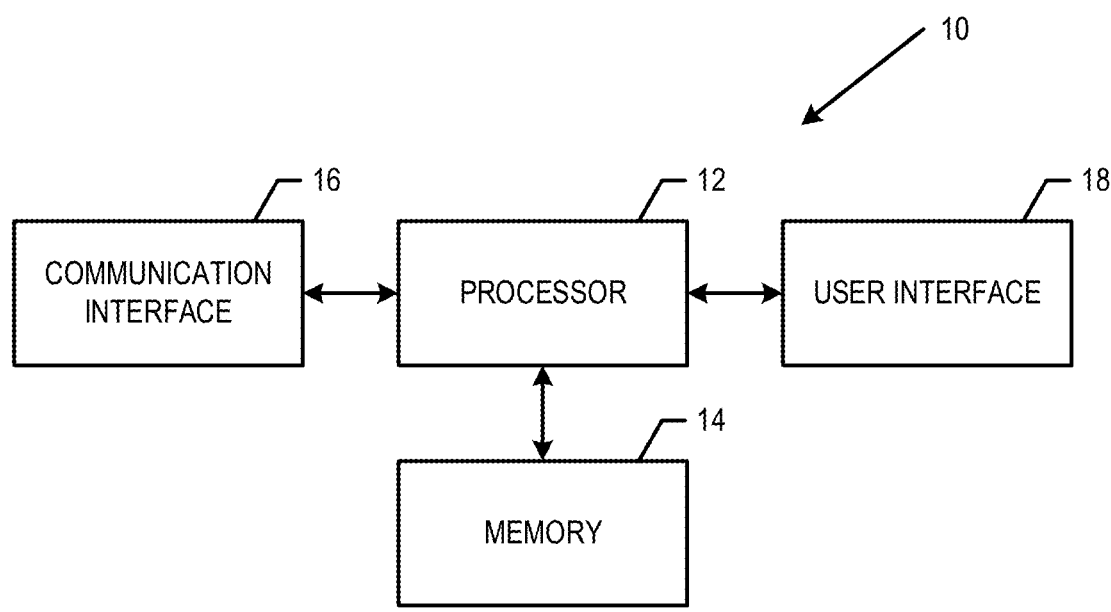
Figure 2B:
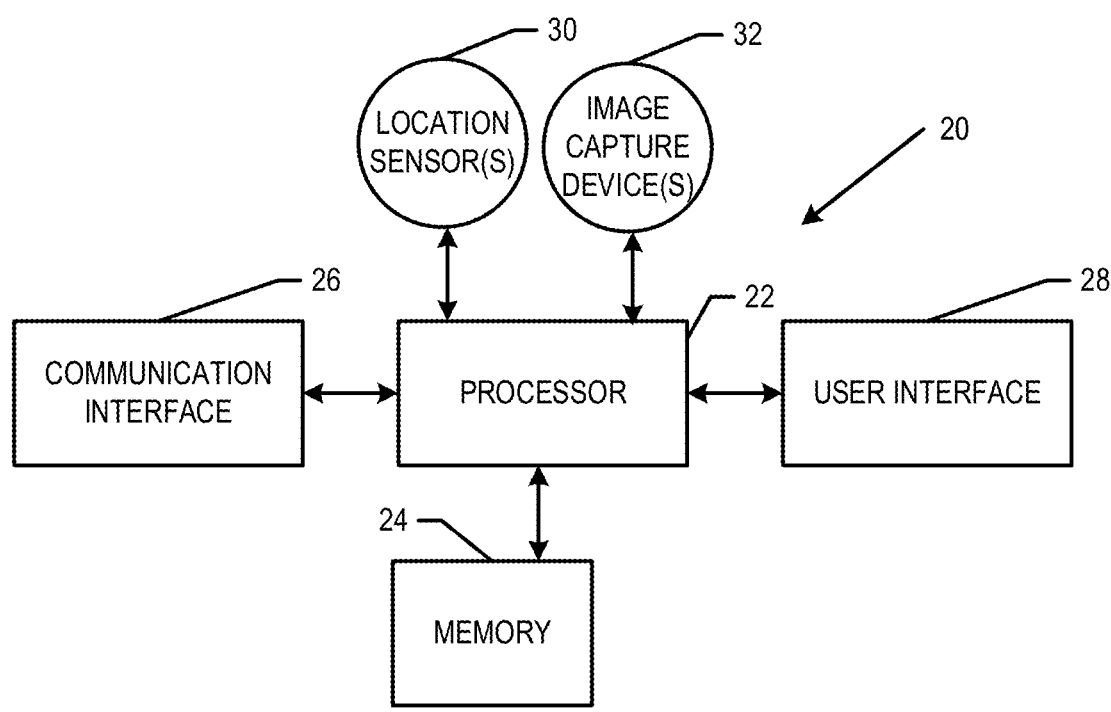
Figure 4:
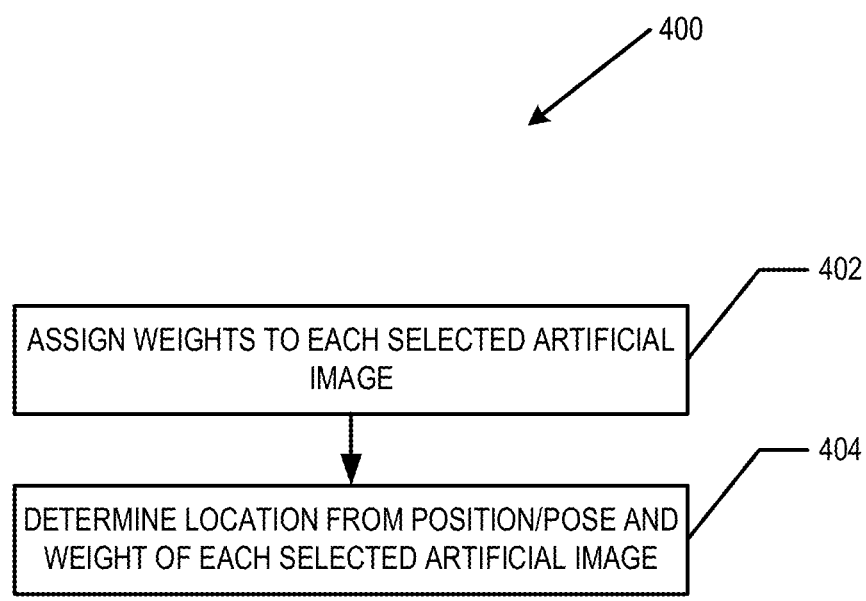
Figure 5:
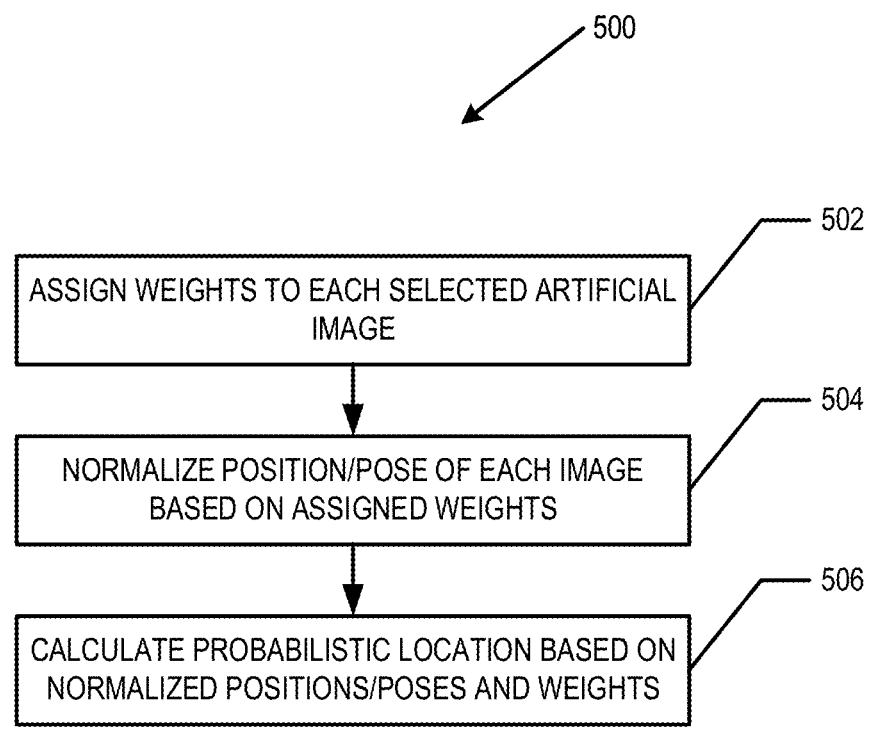
Figure 6:
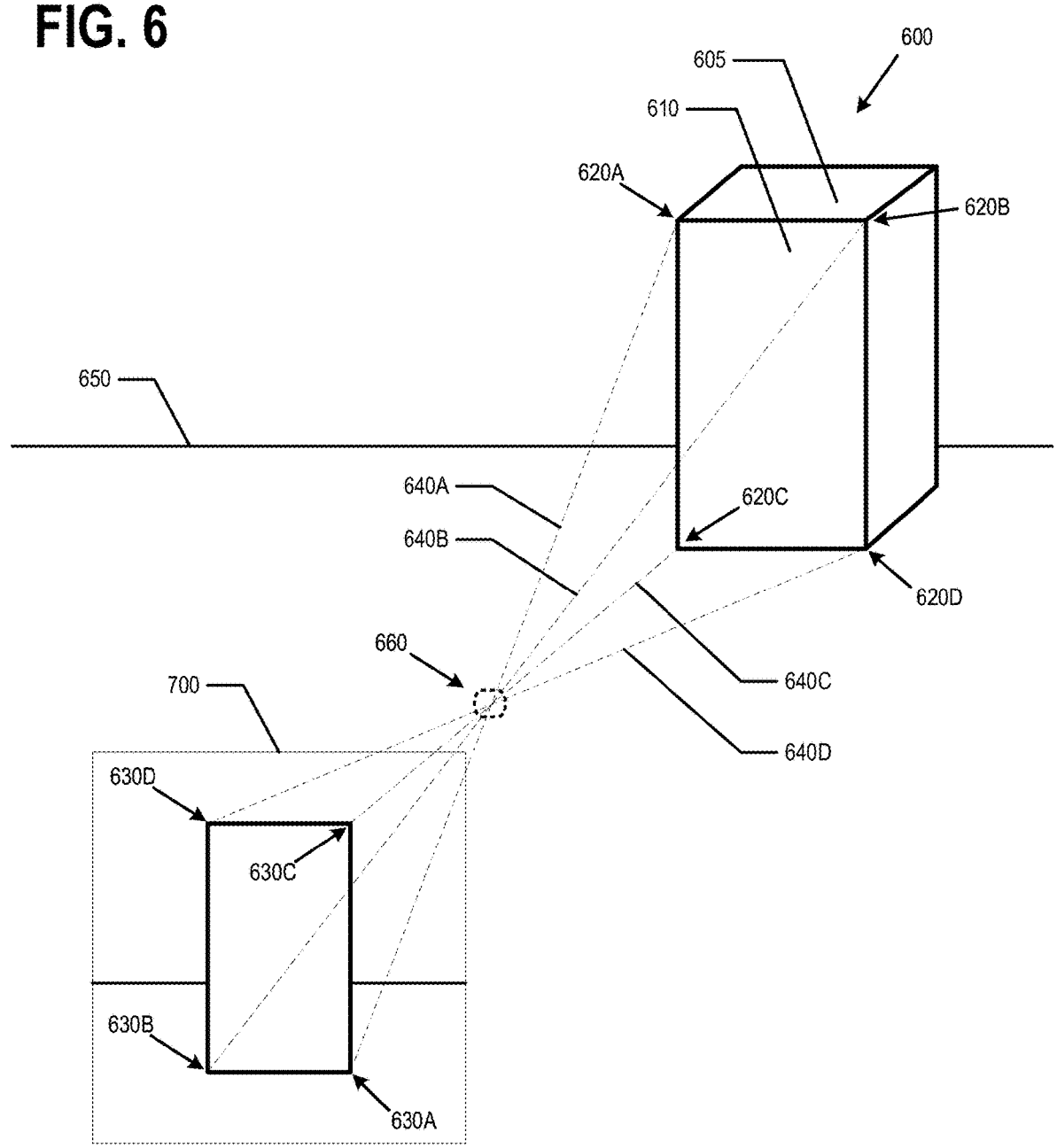
Figure 7:
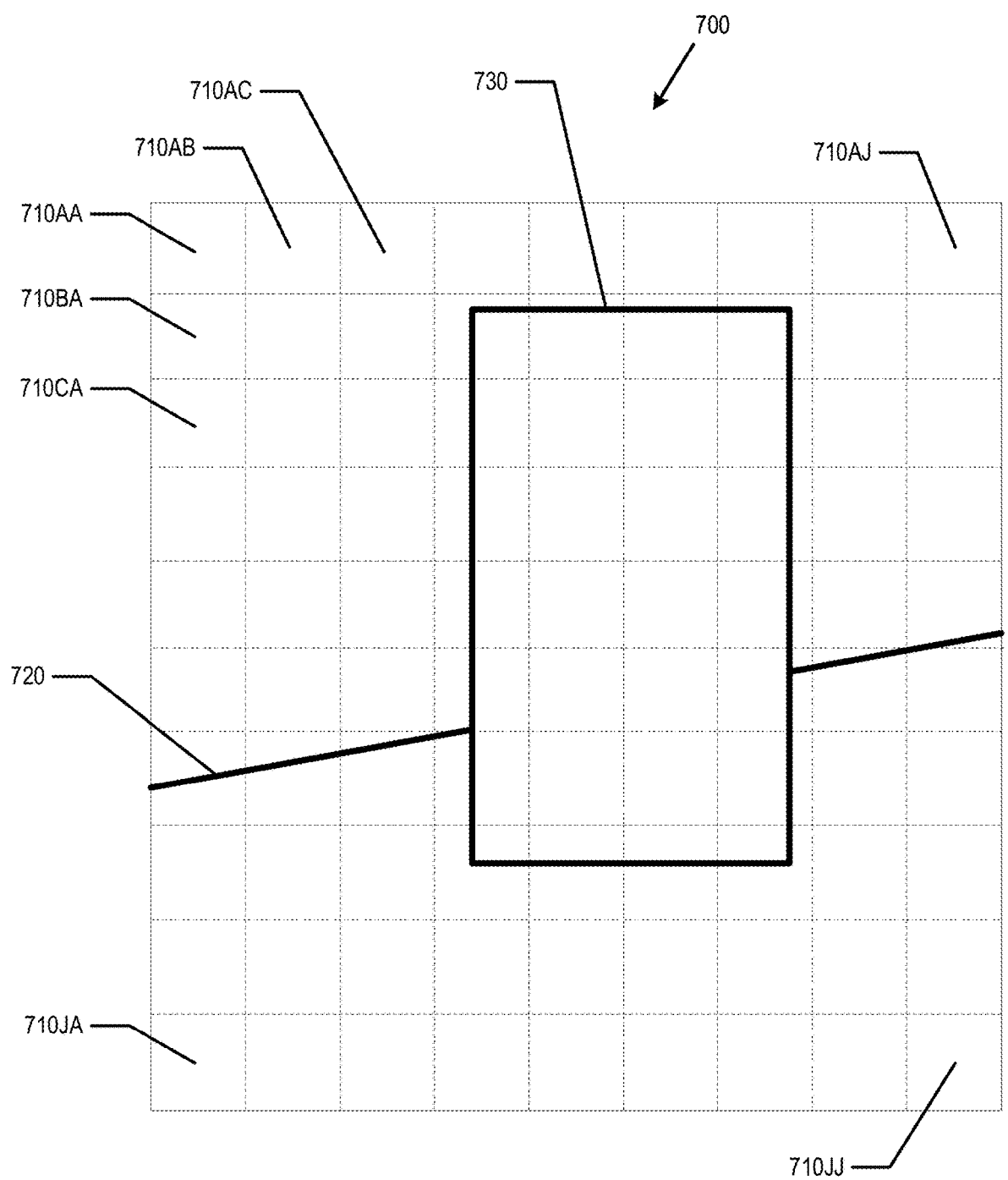

Having thus described certain example embodiments in general terms, reference will hereinafter be made to the accompanying drawings, which are not necessarily drawn to scale, and wherein:

FIG. 1 is a block diagram showing an example architecture of one embodiment of the present disclosure;

FIG. 2A is a block diagram of a remote apparatus that may be specifically configured in accordance with an example embodiment;

FIG. 2B is a block diagram of a mobile apparatus that may be specifically configured in accordance with an example embodiment;

FIG. 3 is a flowchart illustrating operations performed, such as by the remote apparatus of FIG. 2A or the mobile apparatus of FIG. 2B, in accordance with an example embodiment;

FIG. 4 is a flowchart illustrating operations performed, such as by the remote apparatus of FIG. 2A or the mobile apparatus of FIG. 2B, in accordance with an example embodiment;

FIG. 5 is a flowchart illustrating operations performed, such as by the remote apparatus of FIG. 2A or the mobile apparatus of FIG. 2B, in accordance with an example embodiment;

FIG. 6 is a diagram illustrating an example of generating a two-dimensional projection from a three-dimensional model;

FIG. 7 is an example artificial image showing a projection of a three-dimensional model; and FIG. 8 is showing a plurality of artificial images being compared to a first image captured by an image capturing device of the mobile apparatus.

DETAILED DESCRIPTION

Some embodiments will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

I. General Overview

Methods, apparatus and computer program products are provided in accordance with an example embodiment in order to provide efficient and accurate localization of a mobile apparatus in real time or near real time. For example, the position (also referred to herein as a location) and pose of a mobile apparatus may be determined. Certain example embodiments are configured to provide efficient and accurate localization by determining an estimated position and/or pose of the mobile apparatus based on Global Positioning System (GPS), inertial measurement unit(s) (IMU), other position determining systems, or a combination thereof. The estimated position and/or pose may then be used to determine the image positions and poses for the first plurality of artificial images. For example, artificial images may be generated and/or accessed that have image positions and poses that are within a distance range of the estimated position and/or within an angle range of the estimated pose.

In various embodiments, the attributes of sections of a first image captured by an image capture device of the mobile apparatus (and/or in communication with and co-located with the mobile apparatus) are determined by processing and/or analyzing the first image. In an example embodiment, the first image is processed and/or analyzed by segmenting the first image. For example a machine learning based segmentation analysis or other segmentation analysis may be performed on the first image to determine attributes for respective sections of the first image. Attributes of respective sections of the artificial images may also be determined via analysis and/or processing of the artificial images. In various embodiments, the attributes may correspond to a color or color classification of a section, a texture or texture classification of a section, a class (e.g., building, sky, road surface, ground, other) of a feature shown in the section, and/or other attribute. In an example embodiment, a section of an image is a pixel, a group of pixels, and/or a group of contiguous pixels. In an example embodiment, the class corresponding to an attribute may be determined relative to a horizon present in the image; for example, sections not already classified as "building" and are above the horizon may be classified as "sky", and similarly unclassified sections below the horizon are classified as "road" or "ground".

Based on a comparison of the attributes of sections of the artificial images and the attributes of corresponding sections of the first image, at least one artificial image is identified. In various embodiments, the at least one artificial image is identified as having one or more attributes that substantially match one or more attributes of the first image for corresponding sections of the at least one artificial image and the first image. The location and/or the pose of the mobile apparatus is then determined based on the image position and image pose corresponding to the at least one artificial image. In an example embodiment, the identified at least one artificial image is two or more artificial images and the location and/or pose of the mobile apparatus is determined based on the image positions and image poses corresponding to the two or more artificial images. In an example embodiment, a weight may be determined for each of the two or more artificial images based on a respective level with which the attributes of the artificial image match the attributes of the first image in corresponding sections. In an example embodiment, this respective level with which the attributes of the artificial image match with the attributes of the first image may be a score number representing an absolute or relative number of matching pixels or sections. In an example embodiment, a second plurality of artificial images are generated and/or accessed based on the identified at least one artificial image and the artificial images of the second plurality of artificial images may be processed and/or analyzed such that a second at least one artificial image is selected from the second plurality of artificial images based on the second at least one artificial image having attributes that substantially match the attributes of the first image in corresponding sections.

FIG. 1 provides an illustration of an example system that can be used in conjunction with various embodiments of the present disclosure. As shown in FIG. 1, the system may include one or more mobile apparatus 20, one or more remote apparatuses 10, one or more networks 40, and/or the like. In various embodiments, the mobile apparatus 20 may be an in vehicle navigation system, vehicle control system, a mobile computing device, and/or the like. For example, a mobile apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the mobile apparatus 20 may be a smartphone, tablet, personal digital assistant (PDA), and/or other mobile computing device. In another example, the mobile apparatus 20 may be a vehicle control system configured to autonomously drive a vehicle 5, assist in control of a vehicle 5, and/or the like.

In an example embodiment, a remote apparatus 10 may comprise components similar to those shown in the example remote apparatus 10 diagrammed in FIG. 2A. In an example embodiment, the remote apparatus 10 is configured to provide map updates, artificial images and corresponding metadata (e.g., an image position and image pose corresponding to an artificial image), 2D projection images, 3D feature models, position and pose estimations, and/or the like to the mobile apparatus 20. In an example embodiment, the remote apparatus 10 is configured to receive estimated position and pose data, captured images of features and/or the like from the mobile apparatus 20.

In an example embodiment, a mobile apparatus 20 may comprise components similar to those shown in the example mobile apparatus 20 diagrammed in FIG. 2B. In various embodiments, the remote apparatus 10 may be located remotely from the mobile apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), Wi-Fi, Bluetooth Low Energy (BLE), cellular network, and/or the like. In some embodiments, a network 40 may comprise the automotive cloud, digital transportation infrastructure (DTI), radio data system (RDS)/high definition (HD) radio or other digital radio system, and/or the like. For example, a mobile apparatus 20 may be in communication with a remote apparatus 10 via the network 40. For example, the mobile apparatus 20 may communicate with the remote apparatus 10 via a network, such as the Cloud. For example, the Cloud may be a computer network that provides shared computer processing resources and data to computers and other devices connected thereto. For example, the mobile apparatus 20 may be configured to receive one or more artificial images and/or localization data from the remote apparatus 10 and/or the remote apparatus 10 may be configured to receive a captured image from the mobile apparatus 20.

In an example embodiment, as shown in FIG. 2B, the mobile apparatus 20 may comprise a processor 22, memory 24, a communications interface 26, a user interface 28, one or more location sensors 30 (e.g., a location sensor such as a GPS sensor; IMU sensors, accelerometers, gyroscopes, magnetometers, barometers, and/or the like) for determining position and/or pose, one or more image capturing devices (e.g., camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the mobile apparatus 20 to determine one or more features of its surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store information/data that analyzes and compares captured images of the corresponding mobile apparatus 20's surroundings and artificial images of 2D projections of 3D features present in the same surroundings and calculates a position and/or pose based at least in part on the position and/or pose data corresponding to at least one artificial image.

Similarly, as shown in FIG. 2A, the remote apparatus 10 may comprise a processor 12, memory 14, a user interface 18, a communications interface 16, and/or other components configured to perform various operations, procedures, functions or the like described herein. For example, the processor 12 of the remote apparatus 10 may be configured to perform machine learning segmentation and/or comparison analysis of images. Certain example embodiments of the mobile apparatus 20 and the remote apparatus 10 are described in more detail below with respect to FIGS. 2A and 2B.

II. Example Operation

In various embodiments, localization (e.g., determination of a location and pose) of a mobile apparatus 20 is determined based on a first image captured by an image capture device 32 of the mobile apparatus 20. In various embodiments, a location or position may be a latitude and longitude;

a latitude, longitude, and elevation/altitude; and/or the like. In various embodiments, a pose indicates an orientation. For example, a pose may comprise an angle between a reference direction (e.g., North and/or the like) and a direction corresponding to the orientation. For example, a pose indicating orientation may comprise rotation angles about multiple axes (e.g. roll, pitch, yaw), where the multiple axes may be established with respect to some global or local coordinate system.

In an example embodiment, the first image is a real world image. For example, the first image is an image of the surroundings of the mobile apparatus 20. In an example embodiment, the first image is a two-dimensional image (e.g., a photograph, a two-dimensional projection of the surroundings of the mobile apparatus on the image sensor plane of the image capture device 32, and/or the like). In an example embodiment, the first image is a three-dimensional image (e.g., lidar or radar point cloud, optical stereo image processed to generate a three-dimensional image, and/or the like). The first image may be analyzed by either the mobile apparatus 20 or provided (e.g., transmitted) by the mobile apparatus 20 such that the remote apparatus 10 receives the first image and analyzes the first image. For example, the first image may be analyzed to determine attributes for various sections of the first image. In various embodiments, the attributes may correspond to a color or color classification of a section, a texture or texture classification of a section, a class (e.g., building, sky, road surface, ground, other) of a feature shown in the section, and/or other attribute. In an example embodiment, a section of an image is a pixel, a group of pixels, and/or a group of contiguous pixels. In an example embodiment, the determination of attributes of sections of the first image is performed using a segmentation process. In an example embodiment, the segmentation process is executed and/or performed by a segmentation model learned, determined, and/or the like via machine learning. For example, the segmentation model may be a neural network.

In various embodiments, the mobile apparatus 20 and/or remote apparatus 10 may access and/or generate a first plurality of artificial images. In various embodiments, the artificial images are generated based on a three-dimensional model of a geographic area. In an example embodiment, the artificial images may further be based on map information/data accessed from a map database. In an example embodiment, the map database stores a three-dimensional or 2.5-dimensional map. In an example embodiment, the three-dimensional model is a three-dimensional or 2.5-dimensional map. In an example embodiment, the three-dimensional model is a three-dimensional vector model. In an example embodiment, the three-dimensional model comprises information/data respectively describing one or more features (e.g., size, shape, color, texture, reflectance, and/or the like) and the position and orientation of the respective features. In various embodiments, the features are static features. In various embodiments, static features are features within the geographic area corresponding to the three-dimensional model that are expected to not change significantly over the course of an extended period of time (e.g., a few days, few weeks, a few months, and/or a few years).

In an example embodiment, an artificial image is a two-dimensional projection of the three-dimensional model from the perspective of an image position and an image pose. In an example embodiment, an artificial image is a view (e.g., a two-dimensional or three-dimensional view) of the three-dimensional model from the perspective of the image position and the image pose. In an example embodiment, the artificial images are generated and/or modified based on one or more parameters, features, or characteristics of the image capture device 32. For example, parameters or characteristics relating to the lens, shutter speed, aperture, light sensitivity, and/or the like of the image capture device 32 may be accounted for when generating and/or modifying the artificial images. For example, one or more parameters or characteristics of the image capture device 32 that may cause warping of an image captured by the image capture device 32 may be taken into account with a generating the artificial images based on the three-dimensional model or may be used to modify pre-generated artificial images. In various embodiments, the attributes of various sections of the artificial images may be determined, identified, and/or the like based on the three-dimensional model.

In an example embodiment, a location sensor 30 of the mobile apparatus 20 determines an estimated position and/or estimated pose of the mobile apparatus 20. In an example embodiment, the mobile apparatus 20 may use the estimated position and/or estimated pose to determine the image positions and/or image poses corresponding to the accessed and/or generated the first plurality of artificial images. In an example embodiment, the mobile apparatus 20 may provide (e.g., transmit) the estimated position and/or estimated pose (possibly along with the first image and/or as metadata associated with the first image) such that the remote apparatus 10 receives the estimated position and/or estimated pose. The remote apparatus 10 may then access and/or generate the first plurality of artificial images having image positions and/or image poses determined based on the estimated position and/or estimated pose. For example, in an example embodiment, the image position of each image of the first plurality of images is within a distance range of the estimated position. In other words, in an example embodiment, the distance between an image position corresponding to an artificial image of the first plurality of artificial images and the estimated position may satisfy a first distance threshold (e.g., be less than or equal to a first distance threshold). In various embodiment, the first distance threshold may be half a meter, a meter, a few meters, one hundred meters, five hundred meters, one kilometer, and/or the like. In an example embodiment, the image pose of each image of the first plurality of images is within an angle range of the estimated pose. In other words, in an example embodiment, the angle between an image pose corresponding to an artificial image of the first plurality of artificial images and the estimated pose may satisfy a first angle threshold (e.g., be less than a first angle threshold). In various embodiments, the first angle threshold may be one degree, ten degrees, twenty degrees, thirty degrees, forty-five degrees, sixty degrees, ninety degrees, one hundred twenty degrees, one hundred fifty degrees, one hundred eighty degrees, and/or the like.

In various embodiments, the mobile apparatus 20 and/or remote apparatus 10 may identify at least one artificial image from the first plurality of artificial images that has one or more attributes that substantially match the one or more attributes of the first image for corresponding sections of the at least one artificial image and the first image. For example, respective attributes of corresponding sections of an artificial image and a first image match, for the example attribute of color or color class when the attribute for the section of the artificial image is the same or substantially the same as the attribute for the corresponding section of the first image. For example, if the attribute of a section of the artificial image is a first color class (e.g., blue, green, yellow, orange, red, magenta, etc.) and the attribute of the corresponding section of the first image is the first color class, the attributes of the sections match. In an example embodiment, when the attribute of a section of the artificial image is a first color class and the attribute of the corresponding section of the first image is a hex color code; red, green, blue (RGB) code; hue, saturation, lightness (HSL) code; hue, saturation, value (HSV) code; cyan, magenta, yellow, black (CMYK) code; and/or other color code indicating a shade of the first color class, the attributes of the corresponding sections of the artificial image and the first image are determined to match. Similarly, the attribute of the artificial image may be a hex color code; RGB code; HSL code; HSV code; CMYK code; and/or other color code, in various embodiments. In an example embodiment, both the attribute of the section of the artificial image and the corresponding section of the first image are color codes (e.g., hex color codes; RGB codes; HSL codes; HSV codes; CMYK codes; and/or other color codes). When the color code of the section of the artificial image and the color code of the corresponding section of the first image are within a configurable range of one another (e.g., within a configurable "distance" of one another in color space corresponding to the color code), the attribute of the section of the artificial image and the attribute of the corresponding section of the first image are determined to match. If the attribute is a texture or texture code, when the attribute of a section of the artificial image is a first texture code and the attribute of the corresponding section of the first image is a first texture code and/or a texture corresponding to the first texture code, the attributes of the corresponding sections of the artificial image and the first image are determined to match. In another example, if the attribute is a class of a feature shown in the section (e.g., building, ground, road, sky, and/or the like), when the attribute of a section of the artificial image is a first class and the attribute of the corresponding section of the first image is the first class, the attributes of the corresponding sections of the artificial image and the first image are determined to match.

When one or more corresponding sections of an artificial image and the first image match, it may be determined that one or more attributes of sections of the artificial image substantially match the one or more attributes for corresponding sections of the first image. In an example embodiment, a match score is determined for one or more artificial images of the first plurality of artificial images. In an example embodiment, the match score of an artificial image for a first image is determined based on the number and/or fraction/percentage of corresponding sections of the artificial image and the first image that match.

In an example embodiment, the at least one artificial image that is identified from the first plurality of artificial images as having one or more attributes of sections that substantially match the one or more attributes for corresponding sections of the first image consists of the one artificial image having the largest number and/or largest fraction/percentage of matching sections of the first plurality of artificial images. In an example embodiment where the at least one artificial image consists of one artificial image identified from the first plurality of artificial images, the location and/or pose of the mobile apparatus 20 is determined based on the image position and/or image pose corresponding to the at least one artificial image. For example, the location of the mobile apparatus 20 may be determined to be the image position corresponding to the at least one artificial image and/or the pose of the mobile apparatus 20 may be determined to be the image pose corresponding to the at least one artificial image.

In an example embodiment, the at least one artificial image that is identified as having one or more attributes of sections that substantially match the one or more attributes for corresponding sections of the first image consists of a set of artificial images selected from the first plurality of artificial images based on a level of match between attributes of sections of an artificial image and corresponding sections of the first image. In an example embodiment, the at least one artificial image that is identified as having one or more attributes of sections that substantially match the one or more attributes for corresponding sections of the first image consists of a set of k artificial images of the first plurality of artificial images having the largest number and/or largest fraction/percentage of matching sections of the first plurality of artificial images, where k is a configurable positive integer. In an example embodiment, the at least one artificial image that is identified as having one or more attributes of sections that substantially match the one or more attributes for corresponding sections of the first image consists of a set of artificial images of the first plurality of artificial images that have a number and/or fraction/percentage of matching sections that is larger than a threshold number and/or a threshold fraction/percentage. In an example embodiment where the at least one artificial image consists of a set of artificial images identified from the first plurality of artificial images, the location and/or pose of the mobile apparatus 20 is determined based on the image positions and/or image poses corresponding to the artificial images in the set. For example, the location of the mobile apparatus 20 may be determined based on an average and/or weighted average of the image positions corresponding to the artificial images of the set and/or the pose of the mobile apparatus 20 may be determined based on an average and/or weighted average of the image poses corresponding to the artificial images of the set. In an example embodiment, a weight for an artificial image of the set may be determined based on the number and/or fraction/percentage of sections of the artificial image that have attributes that match the corresponding sections of the first image. In an example embodiment, the weights corresponding to the artificial images of the set are normalized such that the sum of the weights corresponding to the artificial images of the set is one.

In an example embodiment, the first plurality of artificial images may be a sparse collection of images. For example, the distance between two adjacent image positions corresponding to artificial images of the first plurality of artificial images may be at least a first distance. A first image position and a second image position are adjacent if there are no other image positions corresponding artificial images of the first plurality of artificial images that are within a circle having a radius equal to the distance between the first image position and the second image position and centered on either the first image position or the second image position. The first image position and the second image position are adjacent, in an example embodiment, if a third image position corresponding to an artificial image of the first plurality of artificial images is located on the circle (but not within the circle) centered either on the first image position or the second image position and having a radius that is equal to the distance between the first image position and the second image position. For example the first image position and the third image position may be equidistant from the second image position such that the first image position is adjacent the second image position and the third image position is adjacent the second image position. In various embodiments, the first distance may be half a meter, a meter, two meters, five meters, ten meters, twenty meters, fifty meters, one hundred meters, five hundred meters, one kilometer, and/or the like. In various embodiments, a second plurality of artificial images is accessed and/or generated based on the identified at least one artificial image.

In various embodiments, the second plurality of artificial images is a denser collection of images than the first plurality of artificial images. For example, the distance between two adjacent image positions corresponding to artificial images of the second plurality of artificial images may be at least a second distance, where the second distance is less than the first distance. For example, the second distance may be one centimeter, five centimeters, ten centimeters, twenty centimeters, fifty centimeters, seventy-five centimeters, one meter, two meters, five meters, and/or the like. In various embodiments, the artificial images of the second plurality of artificial images are accessed and/or generated such that the image positions and/or image poses of the artificial images of the second plurality of artificial images being within a second distance threshold and/or a second angle threshold of the image position and/or image pose of the at least one artificial image. In an example embodiment, the second distance threshold is less than the first distance threshold and/or the second angle threshold is less than the first angle threshold. In various embodiments, the artificial images of the second plurality of artificial images are accessed and/or generated such that the image positions and/or image poses of the artificial images of the second plurality of artificial images being within a candidate area and/or range of candidate orientations of the image position and/or image pose of the at least one artificial image when the at least one artificial image is a set of artificial images selected from the first plurality of artificial images.

A second at least one artificial image may then be identified from the second plurality of artificial images that has one or more attributes that substantially match the attributes for corresponding sections of first image. The location and/or pose of the mobile apparatus 20 may be determined based on the image position and/or image pose corresponding to the second at least one artificial image in an example embodiment. In an example embodiment, a third plurality of artificial images may be accessed and/or generated based on the image position and/or image pose of the second at least one artificial image such that the third plurality of artificial images is a denser collection of images than the second plurality of artificial images. For example, an iterative process may be used to create denser and denser collections of images until the image position and/or image pose of the at least one artificial image selected based on respective attributes of sections of the at least one artificial image substantially matching the respective attributes of corresponding sections of the first image converges and/or for a configurable number of iterations.

Thus, an accurate location and/or pose for the mobile apparatus 20 may be determined in real time (or near real time). Moreover, while described in conjunction with real time or near real time application, some example embodiments may be implemented in other scenarios.

In various embodiments, the mobile apparatus 20 determines the location and/or pose of the mobile apparatus based on the identified at least one artificial image. In various embodiments, the mobile apparatus 20 may then use the location and/or pose of the mobile apparatus 20 to perform one or more navigation functions. Some non-limiting examples of navigation functions include route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. In various embodiments, the remote apparatus 10 may determine the location and/or pose of the mobile apparatus 20 and provide the location and/or pose of the mobile apparatus 20 such that the mobile apparatus 20 receives the location and/or pose of the mobile apparatus 20. The mobile apparatus 20 may then use the location and/or pose of the mobile apparatus 20 to perform one or more navigation functions. In an example embodiment, the remote apparatus 10 may determine the location and/or pose of the mobile apparatus 20, use the location and/or pose of the mobile apparatus 20 to perform one or more navigation functions, and provide a result of the one or more navigation functions and/or the location and/or pose of the mobile apparatus 20 such that the mobile apparatus 20 receives the result of the one or more navigation functions and/or location and/or pose of the mobile apparatus 20.

In various embodiments, the determined location and/or pose of the mobile apparatus 20 may also be used as a georeference for radio probe data and/or other probe data generated by one or more sensors onboard the mobile apparatus 20. For example, a mobile apparatus 20 may be part of a "crowd-sourced" map generation process and may generate radio probe data and/or other probe data (e.g., via one or more sensors that are part of the mobile apparatus 20 and/or in communication with and co-located with the mobile apparatus 20). The determined location and/or pose of the mobile apparatus 20 may be used to assign a location and/or pose to various sets of radio probe data and/or other probe data provided by the mobile apparatus 20 to a remote apparatus 10 for use in generating a radio map and enabling radio-based positioning. For example, an instance of radio probe data and/or other probe data may be associated with (e.g., as a georeferenced therefor) a location and/or pose determined for the mobile apparatus 20 based at least in part on a first image captured by the image capture device 32 at approximately and/or substantially the same time as when the instance of radio probe data and/or other probe data was captured.

FIG. 3 provides a flowchart of method 300 for determining a location and pose of a mobile apparatus 20 based on a first image captured by an image capture device 32 of the mobile apparatus 20 and artificial images generated based on a three-dimensional model. In various embodiments, the method 300 is performed by the mobile apparatus 20. In various embodiments, the method 300 is performed by the remote apparatus 10.

Starting at block 302, a first image capturing one or more features in the surroundings of the mobile apparatus 20 is received. In an example embodiment, an image capture device 32 (possibly responsive to user interaction with the mobile apparatus 20 via the user interface 28) captures a first image that includes representations of one or more features in the surrounds of the mobile apparatus 20. In an example embodiment, the one or more features include at least one static feature. The image capture device 32 may provide the first image such that the processor 22 of the mobile apparatus 20 receives the first image. In an example embodiment, the mobile apparatus 20 determines the location and/or pose of the mobile apparatus 20 and may not provide the first image such that the remote apparatus 10 receives the first image. In another example embodiment, the mobile apparatus 20 provides (e.g., transmits) the first image such that the remote apparatus 10 receives the first image. For example, the mobile apparatus 20 comprises means, such as the processor 22, memory 24, image capture device 32, and/or the like, for receiving a first image captured by the image capture device 32. In an example embodiment, the mobile apparatus 20 comprises means, such as processor 22, communications interface 26, and/or the like, for providing the first image. In an example embodiment, the remote apparatus comprises means, such as processor 12, memory 14, communications interface 16, and/or the like, for receiving the first image.

In an example embodiment, an estimated position and/or estimated pose of the mobile apparatus 20 is received. For example, one or more location sensors 30 of the mobile apparatus 20 may determine an estimated position and/or pose of the mobile apparatus 20. The one or more location sensors 30 may provide the estimated position and/or estimated pose such that the processor 22 of the mobile apparatus 20 receives the estimated position and/or estimated pose. In an example embodiment, the mobile apparatus 20 determines the location and/or pose of the mobile apparatus 20 and may not provide the estimated position and/or estimated pose such that the remote apparatus 10 receives the estimated position and/or estimated pose. In another example embodiment, the mobile apparatus 20 provides (e.g., transmits) the estimated position and/or estimated pose such that the remote apparatus 10 receives the estimated position and/or estimated pose. For example, the estimated position and/or estimated pose may be provided along with (e.g., as metadata associated with) the first image. For example, the mobile apparatus 20 comprises means, such as the processor 22, memory 24, location sensors 30, and/or the like, for receiving an estimated position and/or estimated pose determined by the one or more location sensors 30. In an example embodiment, the mobile apparatus 20 comprises means, such as processor 22, communications interface 26, and/or the like, for providing the estimated position and/or estimated pose. In an example embodiment, the remote apparatus comprises means, such as processor 12, memory 14, communications interface 16, and/or the like, for receiving the estimated position and/or estimated pose.

At block 304, a first plurality of artificial images is accessed. In various embodiments, each artificial image of the first plurality of artificial images is generated by taking a projection of a three-dimensional model of a geographic area from an image position and image pose. For example, the mobile apparatus 20 may access a first plurality of artificial images stored in memory 24 and/or request and receive a first plurality of artificial images that are stored remotely (e.g., stored by the remote apparatus 10). For example, the mobile apparatus 20 may comprise means, such as processor 22, memory 24, communications interface 26, and/or the like for accessing a first plurality of artificial images. For example, the remote apparatus 10 may access a first plurality of artificial images from memory 14. For example, the remote apparatus 10 may comprise means, such as processor 12, memory 14, and/or the like for accessing a first plurality of artificial images. In an example embodiment, accessing a first plurality of artificial images comprises accessing a three-dimensional model (and/or portions thereof) and generating the first plurality of artificial images by taking projections of the three-dimensional model at various image positions and/or image poses. For example, an artificial image may be a two-dimensional projection of the three-dimensional model taken from the perspective of an image position and image pose. In an example embodiment, the artificial images are generated and/or modified based on one or more parameters, features, or characteristics of the image capture device 32. For example, parameters or characteristics relating to the lens, shutter speed, aperture, light sensitivity, and/or the like of the image capture device 32 may be accounted for when generating and/or modifying the artificial images. For example, one or more parameters or characteristics of the image capture device 32 that may cause warping of an image captured by the image capture device 32 may be taken into account with a generating the artificial images based on the three-dimensional model or may be used to modify pre-generated artificial images.

In various embodiments, the attributes of various sections of the artificial images may be determined, identified, and/or the like based on the three-dimensional model. In various embodiments, the attributes may correspond to a color or color classification of a section, a texture or texture classification of a section, a class (e.g., building, sky, road surface, ground, other) of a feature shown in the section, and/or other attribute. In an example embodiment, a section of an image is a pixel, a group of pixels, and/or a group of contiguous pixels. For example, the three-dimensional model may include static feature information/data indicating a class, color, texture, and/or the like of various static features. Generating the artificial image may include determining at least one attribute for at least one section of the artificial image based on the static feature information/data corresponding to a static feature projected into that section of the artificial image.

In an example embodiment, the first plurality of artificial images are accessed, selected, and/or the like based on the estimated position and/or estimated pose. For example, the first plurality of artificial images may comprise artificial images corresponding to image positions and/or image poses selected based at least in part on the estimated position and/or estimated pose. For example, in an example embodiment, the image position of each image of the first plurality of images is within a distance range of the estimated position. In other words, in an example embodiment, the distance between an image position corresponding to an artificial image of the first plurality of artificial images and the estimated position may satisfy a first distance threshold (e.g., be less than or equal to a first distance threshold). In various embodiment, the first distance threshold may be half a meter, a meter, a few meters, one hundred meters, five hundred meters, one kilometer, and/or the like. In an example embodiment, the image pose of each image of the first plurality of images is within an angle range of the estimated pose. In other words, in an example embodiment, the angle between an image pose corresponding to an artificial image of the first plurality of artificial images and the estimated pose may satisfy a first angle threshold (e.g., be less than a first angle threshold). In various embodiments, the first angle threshold may be one degree, ten degrees, twenty degrees, thirty degrees, forty-five degrees, sixty degrees, ninety degrees, one hundred twenty degrees, one hundred fifty degrees, one hundred eighty degrees, and/or the like.

At block 306, attributes for sections of the first image are determined. For example, using one or more image analysis processes, the first image may be processed to determine, identify, and/or the like attributes for sections of the first image. For example, the mobile apparatus 20 may process and/or analyze the first image to determine an attribute for respective sections of the first image. For example, the mobile apparatus 20 may comprise means, such as processor 22, memory 24, and/or the like, for processing and/or analyzing the first image to determine an attribute for respective sections of the first image. For example, the remote apparatus 10 may process and/or analyze the first image to determine an attribute for respective sections of the first image. For example, the remote apparatus 10 may comprise means, such as processor 12, memory 14, and/or the like, for processing and/or analyzing the first image to determine an attribute for respective sections of the first image. In various embodiments, an image segmentation process is used to determine an attribute for respective sections of the first image. For example, the first image may be provided as input to a segmentation model (e.g., operating on the remote apparatus 10 and/or mobile apparatus 20) and the segmentation model may provide an attribute for respective sections of the first image as output. In various embodiments, the segmentation model is configured to segment of the first image into segments each having the same and/or similar attributes and determining the attributes of those segments. In an example embodiment, the segmentation model is a trained using a machine learning technique. In an example embodiment, the segmentation model is a deep net and/or neural network. Various segmentation models are known in the art and may be used to determine an attribute of respective sections of the first image, in various embodiments.

At block 308, at least one artificial image having attributes that substantially match the attributes for corresponding sections of the at least one artificial image and the first image is identified. For example, the mobile apparatus 20 may identify at least one artificial image having attributes that substantially match the attributes for corresponding sections of the at least one artificial image and the first image. For example, the mobile apparatus 20 may comprise means, such as processor 22, memory 24, and/or the like, for identifying at least one artificial image having attributes that substantially match the attributes for corresponding sections of the at least one artificial image and the first image. For example, the remote apparatus 10 may identify at least one artificial image having attributes that substantially match the attributes for corresponding sections of the at least one artificial image and the first image. For example, the remote apparatus 10 may comprise means, such as processor 12, memory 14, and/or the like, for identifying at least one artificial image having attributes that substantially match the attributes for corresponding sections of the at least one artificial image and the first image.

For example, respective attributes of corresponding sections of an artificial image and a first image match, for the example attribute of color or color class, when the attribute for the section of the artificial image is the same or substantially the same as the attribute for the corresponding section of the first image. For example, if the attribute of a section of the artificial image is a first color class (e.g., blue, green, yellow, orange, red, magenta, etc.) and the attribute of the corresponding section of the first image is the first color class, the attributes of the sections match. In an example embodiment, when the attribute of a section of the artificial image is a first color class and the attribute of the corresponding section of the first image is a hex color code; red, green, blue (RGB) code; hue, saturation, lightness (HSL) code; hue, saturation, value (HSV) code; cyan, magenta, yellow, black (CMYK) code; and/or other color code indicating a shade of the first color class, the attributes of the corresponding sections of the artificial image and the first image are determined to match. Similarly, the attribute of the artificial image may be a hex color code; RGB code; HSL code; HSV code; CMYK code; and/or other color code, in various embodiments. In an example embodiment, both the attribute of the section of the artificial image and the corresponding section of the first image are color codes (e.g., hex color codes; RGB codes; HSL codes; HSV codes; CMYK codes; and/or other color codes). When the color code of the section of the artificial image and the color code of the corresponding section of the first image are within a configurable range of one another (e.g., within a configurable "distance" of one another in color space corresponding to the color code), the attribute of the section of the artificial image and the attribute of the corresponding section of the first image are determined to match. If the attribute is a texture or texture code, when the attribute of a section of the artificial image is a first texture code and the attribute of the corresponding section of the first image is a first texture code and/or a texture corresponding to the first texture code, the attributes of the corresponding sections of the artificial image and the first image are determined to match. In another example, if the attribute is a class of a feature shown in the section (e.g., building, ground, road, sky, and/or the like), when the attribute of a section of the artificial image is a first class and the attribute of the corresponding section of the first image is the first class, the attributes of the corresponding sections of the artificial image and the first image are determined to match.

When one or more corresponding sections of an artificial image and the first image match, it may be determined that one or more attributes of sections of the artificial image substantially match the one or more attributes for corresponding sections of the first image. In an example embodiment, a match score is determined for one or more artificial images of the first plurality of artificial images. In an example embodiment, the match score of an artificial image for a first image is determined based on the number and/or fraction/percentage of corresponding sections of the artificial image and the first image that match.

In an example embodiment, the at least one artificial image that is identified from the first plurality of artificial images as having one or more attributes of sections that substantially match the one or more attributes for corresponding sections of the first image consists of the one artificial image having the largest match score (e.g., largest number and/or largest fraction/percentage of matching sections) of the first plurality of artificial images. In an example embodiment, the at least one artificial image that is identified as having one or more attributes of sections that substantially match the one or more attributes for corresponding sections of the first image consists of a set of artificial images selected from the first plurality of artificial images based on the match score indicating that the level of match between attributes of sections of an artificial image and corresponding sections of the first image satisfies a configurable threshold match requirement. In an example embodiment, the at least one artificial image that is identified as having one or more attributes of sections that substantially match the one or more attributes for corresponding sections of the first image consists of a set of k artificial images of the first plurality of artificial images having the largest match scores of the first plurality of artificial images, where k is a configurable positive integer.

In various embodiments, the artificial images are generated and/or modified to have a field of view that is substantially the same as the image capture device 32 and corresponding sections of an artificial image and first image may be determined by aligning edges of the artificial image and the first image. In an example embodiment, corresponding sections of an artificial image and the first image are determined by aligning a center of the artificial image with the center of the first image. In an example embodiment, corresponding sections of an artificial image and the first image are determined by aligning one or two edges of a static feature present in both the artificial image and the first image. Various other techniques may be used to determine corresponding sections of the artificial image and the first image in various embodiments.

At block 310, a location and/or pose of the mobile apparatus 20 is determined based at least in part on the image position and/or image pose corresponding to the identified at least one artificial image. For example, the mobile apparatus 20 may determine a location and/or pose of the mobile apparatus 20 based at least in part on the image position and/or image pose corresponding to the identified at least one artificial image. For example, the mobile apparatus 20 may comprise means, such as processor 22, memory 24, and/or the like, for determining a location and/or pose of the mobile apparatus 20 based at least in part on the image position and/or image pose corresponding to the identified at least one artificial image. For example, the remote apparatus 10 may determine a location and/or pose of the mobile apparatus 20 based at least in part on the image position and/or image pose corresponding to the identified at least one artificial image. For example, the remote apparatus 10 may comprise means, such as processor 12, memory 14, and/or the like, for determining a location and/or pose of the mobile apparatus 20 based at least in part on the image position and/or image pose corresponding to the identified at least one artificial image.

In an example embodiment where the at least one artificial image consists of one artificial image identified from the first plurality of artificial images, the location and/or pose of the mobile apparatus 20 is determined based at least in part on the image position and/or image pose corresponding to the at least one artificial image. For example, the location of the mobile apparatus 20 may be determined to be the image position corresponding to the at least one artificial image and/or the pose of the mobile apparatus 20 may be determined to be the image pose corresponding to the at least one artificial image.

In an example embodiment where the identified at least one artificial image consists of a set of artificial images identified from the first plurality of artificial images, the location and/or pose of the mobile apparatus 20 is determined based at least in part on the image positions and/or image poses corresponding to the artificial images in the set. For example, the location of the mobile apparatus 20 may be determined based on an average and/or weighted average of the image positions corresponding to the artificial images of the set and/or the pose of the mobile apparatus 20 may be determined based on an average and/or weighted average of the image poses corresponding to the artificial images of the set. In an example embodiment, a weight for an artificial image of the set may be determined based on the number and/or fraction/percentage of sections of the artificial image that have attributes that match the corresponding sections of the first image. In an example embodiment, the weights corresponding to the artificial images of the set are normalized such that the sum of the weights corresponding to the artificial images of the set is one.

For example, FIG. 4 provides a flowchart illustrating an example method 400 for determining the location and/or pose of the mobile apparatus 20 based on the at least one artificial image, wherein the at least one artificial image is a set of artificial images selected from the first plurality of images. Starting at block 402, weights are assigned to each artificial image of the set. For example, the remote apparatus 10 and/or mobile apparatus 20 may assign a weight to each artificial image of the set. For example, the remote apparatus 10 and/or mobile apparatus 20 may comprise means, such as processor 12, 22, memory 14, 24, and/or the like, for assigning a weight to each artificial image of the set. In an example embodiment, the weight assigned to an artificial image is determined based at least in part on the match score determined for the artificial image with respect to the first image. For example, the match score may be determined based at least in part on a determination of the number and/or fraction/percentage of corresponding sections of the artificial image and the first image that match.

At block 404, the location and/or pose of the mobile apparatus 20 are determined based on the weights corresponding to the artificial images of the set and the image positions and/or image poses corresponding to the artificial images of the set. For example, the remote apparatus 10 and/or mobile apparatus 20 may determine the location and/or pose of the mobile apparatus 20 based on the weights corresponding to the artificial images of the set and the image positions and/or image poses corresponding to the artificial images of the set. For example, the remote apparatus 10 and/or mobile apparatus 20 may comprise means, such as processor 12, 22, memory 14, 24, and/or the like, for determining the location and/or pose of the mobile apparatus 20 based on the weights corresponding to the artificial images of the set and the image positions and/or image poses corresponding to the artificial images of the set. For example, the weights may be used to determine a weighted average of the image positions to determine the location of the mobile apparatus 20. For example, the weights may be used to determine a weighted average of the image poses to determine the pose of the mobile apparatus 20.

FIG. 5 provides a flowchart illustrating another example method 500 for determining the location and/or pose of the mobile apparatus 20 based on the at least one artificial image, wherein the at least one artificial image is a set of artificial images selected from the first plurality of images. Starting at block 502, weights are assigned to each artificial image of the set. For example, the remote apparatus 10 and/or mobile apparatus 20 may assign a weight to each artificial image of the set. For example, the remote apparatus 10 and/or mobile apparatus 20 may comprise means, such as processor 12, 22, memory 14, 24, and/or the like, for assigning a weight to each artificial image of the set. In an example embodiment, the weight assigned to an artificial image is determined based at least in part on the match score determined for the artificial image with respect to the first image. For example, the match score may be determined based at least in part on a determination of the number and/or fraction/percentage of corresponding sections of the artificial image and the first image that match.

At block 504, normalized positions and/or poses for each artificial image of the set of artificial images are determined. For example, the remote apparatus 10 and/or mobile apparatus 20 may determine normalized positions and/or poses for each artificial image of the set of artificial images. For example, the remote apparatus 10 and/or mobile apparatus 20 may comprise means, such as processor 12, 22, memory 14, 24, and/or the like, for determining normalized positions and/or poses for each artificial image of the set of artificial images. For example, a normalized may be determined for each artificial image of the set such that the sum of the weights for the artificial images of the set equal one. The normalized positions and/or poses of each artificial image of the set of artificial images may then be determined by multiplying the positions and/or pose of an artificial image of the set of artificial images by the corresponding normalized weight. At block 506, the location and/or pose of the mobile apparatus 20 are determined based on the normalized positions and/or poses corresponding to the artificial images. For example, the remote apparatus 10 and/or mobile apparatus 20 may determine the location and/or pose of the mobile apparatus 20 based on the normalized positions and/or poses corresponding to the artificial images. For example, the remote apparatus 10 and/or mobile apparatus 20 may comprise means, such as processor 12, 22, memory 14, 24, and/or the like, for determining the location and/or pose of the mobile apparatus 20 based on the normalized positions and/or poses corresponding to the artificial images. For example, the normalized positions and/or poses may be summed to determine a probabilistic location and/or pose of the mobile apparatus 20.

In an example embodiment, the first plurality of artificial images is a sparse collection of images. For example, the distance between two adjacent image positions corresponding to artificial images of the first plurality of artificial images may be at least a first distance. A second plurality of artificial images may then be accessed and/or generated based on the identified at least one artificial image. The second plurality of artificial images is a denser collection of images than the first plurality of artificial images. For example, the distance between two adjacent image positions corresponding to artificial images of the second plurality of artificial images may be at least a second distance, where the second distance is less than the first distance. In an example embodiment, the distance between two adjacent image positions corresponding to artificial images of the second plurality of artificial images is less than the first distance. In various embodiments, the artificial images of the second plurality of artificial images are accessed and/or generated such that the image positions and/or image poses of the artificial images of the second plurality of artificial images being within a second distance threshold and/or a second angle threshold of the image position and/or image pose of the at least one artificial image. In an example embodiment, the second distance threshold is less than the first distance threshold and/or the second angle threshold is less than the first angle threshold.

In various embodiments, the artificial images of the second plurality of artificial images are accessed and/or generated such that the image positions and/or image poses of the artificial images of the second plurality of artificial images are within a candidate area and/or range of candidate orientations of the image position and/or image pose of the at least one artificial image when the at least one artificial image is a set of artificial images selected from the first plurality of artificial images. For example, the image positions of the artificial images in the set of artificial images may be used to define a candidate area. The candidate area may be an area that the location of the mobile apparatus 20 is expected to be within. For example, the image positions of artificial images in the second plurality of artificial images may be within the candidate area. For example, the image poses of the artificial images in the set of artificial images may be used to define a range of candidate orientations. The range candidate orientations may be a range of angles with respect to a reference angle that the pose of the mobile apparatus 20 is expected to be within. For example, the image poses of artificial images in the second plurality of artificial images may be within the range of candidate orientations.

A second at least one artificial image may then be identified from the second plurality of artificial images that has one or more attributes that substantially match the attributes for corresponding sections of first image. The location and/or pose of the mobile apparatus 20 may be determined based on the image position and/or image pose corresponding to the second at least one artificial image in an example embodiment. In an example embodiment, a third plurality of artificial images may be accessed and/or generated based on the image position and/or image pose of the second at least one artificial image such that the third plurality of artificial images is a denser collection of images than the second plurality of artificial images. For example, an iterative process may be used to create denser and denser collections of images until the image position and/or image pose of the at least one artificial image selected based on respective attributes of sections of the at least one artificial image substantially matching the respective attributes of corresponding sections of the first image converges and/or for a configurable number of iterations. In various embodiments, the first plurality of artificial images, second plurality of artificial images, and/or subsequent pluralities of artificial images may each and/or in combination comprise 50 to a few thousand images. For example, in an example embodiment, the first plurality of artificial images, second plurality of artificial images, and/or subsequent pluralities of artificial images may each and/or in combination comprise a few hundred artificial images.

Thus, an accurate location and/or pose for the mobile apparatus 20 may be determined in real time (or near real time). Moreover, while described in conjunction with real time or near real time application, some example embodiments may be implemented in other scenarios.

In various embodiments, the mobile apparatus 20 determines the location and/or pose of the mobile apparatus based on the identified at least one artificial image. In various embodiments, the mobile apparatus 20 may then use the location and/or pose of the mobile apparatus 20 to perform one or more navigation functions. Some non-limiting examples of navigation functions include route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. In various embodiments, the remote apparatus 10 may determine the location and/or pose of the mobile apparatus 20 and provide the location and/or pose of the mobile apparatus 20 such that the mobile apparatus 20 receives the location and/or pose of the mobile apparatus 20. The mobile apparatus 20 may then use the location and/or pose of the mobile apparatus 20 to perform one or more navigation functions. In an example embodiment, the remote apparatus 10 may determine the location and/or pose of the mobile apparatus 20, use the location and/or pose of the mobile apparatus 20 to perform one or more navigation functions, and provide a result of the one or more navigation functions and/or the location and/or pose of the mobile apparatus 20 such that the mobile apparatus 20 receives the result of the one or more navigation functions and/or location and/or pose of the mobile apparatus 20.

Reference is now made to FIG. 6, which provides a diagram illustrating generation of a two-dimensional projection from a three-dimensional model. FIG. 6 shows an example two-dimensional (2D) projection image 700. In an example embodiment, the 2D projection image 700 may be one of a first plurality of artificial images, second plurality of artificial images, and/or subsequent plurality of artificial images (e.g., third, fourth, fifth, etc. plurality of artificial images). In various embodiments, the 2D projection image 700 may be one of a plurality of artificial images accessed and/or generated by the mobile apparatus 20 and/or remote apparatus 10 (e.g., at block 304). FIG. 6 demonstrates the 2D projection image 700 being generated based on a three-dimensional (3D) model 600 of a geographic area. In an example embodiment, 3D model 600 is a three-dimensional or 2.5-dimensional map. In various example embodiments, 3D model 600 is a three-dimensional model of one or more buildings or other static features in the geographical area. 3D model 600 is composed by a number of geometric elements (e.g., including faces 610) and corresponding metadata (e.g., color information, texture information, and/or the like for the corresponding geometric element). For example, a building 605 or other static feature is represented in the 3D model 600 as a vertical rectangular prism defined by a plurality (e.g., six) of faces 610. FIG. 6 illustrates a horizon 650 behind the building 605 of the 3D model 600. The horizon 650 may also be known as a skyline and is commonly understood as the apparent line that separates the ground from the sky from a corresponding viewpoint and/or perspective. In various embodiments, the 3D model 600 may comprise information/data defining the horizon 650 such the location, orientation, and/or the like of the horizon 650 with respect to one or more buildings 605 and/or other static features of the 3D model 600 may be determined from various viewpoints and/or perspectives (e.g., image positions and/or image poses). In various embodiments, the horizon 650 may be at any angle as dictated by the surrounding geography and topography. For example, if 3D model 600 is positioned upon a slope such as a hill or other incline, then horizon 650 may be a line that exhibits the same slope, or angle of inclination, thus continuing to be a line that separates the sloped ground from the sky. In other various embodiments, the horizon 650 may be a crooked line instead of a straight line based on the corresponding topography. Horizon 650 may show an inclined slope in one portion due to an inclined slope in the corresponding geographic area and a declined slope in another portion of the line due to a declined slope in the corresponding geographic area. FIG. 6 shows an example embodiment where the horizon 650 is a straight and flat (or 180° or horizontal) line.

The 3D model 600 is projected onto the 2D projection image 700 through an aperture 660. Aperture 660 may be and/or be a representation of a camera viewpoint. In an example embodiment, the aperture 660 may be determined, defined, selected, and/or the like based on the image capture device 32. FIG. 6 shows an example embodiment demonstrating projection through aperture 660, representing a pinhole camera. Aperture 660 may be positioned at a certain position and/or pose, and this position and/or pose may be associated with the resulting 2D projection image 700 (e.g., the image position and/or image pose of the resulting artificial image). Depending on the position and/or pose of the aperture 660, different 2D projection images may result. In an example embodiment, the position and/or pose of aperture 660 may be constrained or limited. For example, one or more location sensors 30 of the mobile apparatus 20 may determine an estimated position and/or pose of the mobile apparatus 20, and the position and/or pose of the aperture 660 may be constrained to positions only within N meters of the estimated position of mobile apparatus 20 and further constrained to poses only within M degrees of the estimated pose or orientation of mobile apparatus 20, where N and M may be predetermined and/or configurable values, thus limiting the number of candidate 2D projection images 700 generated and reducing necessary memory storage or computational power. For example, the estimated pose or orientation of mobile apparatus 20 may include rotation angle data in multiple axes (e.g. roll, pitch, yaw), and the pose of the aperture 660 may be constrained to poses only within a $M_1$ degrees for a first axis, $M_2$ degrees for a second axis, and so on. For example, N may be the first, second, or subsequent distance threshold and M may be the first, second, or subsequent angle threshold.

In the pinhole camera model illustrated in FIG. 6, aperture 660 is modeled or described as an exact point. As such, the embodiments that follow adhere to the ideal pinhole camera model which does not include image effects resulting from lenses or finite aperture sizes. When projecting 3D model 600 onto a 2D projection image 700, each face 610 of building 605 (or other buildings and/or other static features) is projected individually. For visual clarity, FIG. 6 demonstrates the projection of a face 610 most normal to the aperture 660. Each face 610 is defined by a set of vertices 620 in three-dimensional space, substantially in the same plane. In various embodiments, the number of vertices 620 defining a face 610 correlates to the shape of the face 610. For example, FIG. 6 illustrates a rectangular face 610 which is defined by four vertices (620A-D). It follows that if face 610 was a hexagon for example, face 610 would then be defined by six vertices. In an example embodiment, the faces 610 may be defined as regular or irregular polygons or other two dimensional shapes.

Each face 610 of building 605 of the 3D model 600 is projected onto the 2D projection image 700 by projecting vertices first. For example, vertex 620A in the 3D model 600 is projected to be vertex 630A in the 2D projection image 700. A straight projection line 640A is drawn from the vertex 620A to the pinhole aperture 660. This projection line 640A is then extended to the projection plane including the 2D projection image 700, plotting vertex 630A at the corresponding point. The projection lines 640A-D may be associated with distance values representing the distance from the vertex of the 3D model 600 to the projected vertex in the 2D projection image 700. This process is repeated with vertices 620B-D corresponding to projection lines 640B-D resulting in vertices 630B-D. As it can be seen in FIG. 6, the pinhole camera model results in the projection of face 610 geometrically reflected both horizontally and vertically, or alternatively rotated 180°. For example, vertex 620A is positioned at the top left corner of face 610, but is positioned closer to the bottom right corner of 2D projection image 700. In an example embodiment, 2D projection image 700, which is an example artificial image of the first, second, or subsequent plurality of artificial images, is reflected both horizontally and vertically again, or alternatively rotated 180°, before being analyzed and compared with the first image of the surroundings captured by the image capture device 32, which may illustrate a feature represented by 3D model 600 (e.g., building 605) oriented as in real life. After vertices 620A-D are projected onto the projection plane including the 2D projection image 700, pixels located within the face defined by the projected vertices 630A-D are then similarly defined.

To determine which pixels are located within the face defined by the projected vertices 630A-D, a distance from each pixel within the defined projected face to the face 610 is computed as the weighted average of the distance values associated with the projection lines 640A-D. For example, each pixel within the defined projected face has a distance value $pd_{ij}$ calculated by the equation: $pd_{ij} = \Sigma_{k=1, 2 \ldots N} d_k |vp_k - p_{ij}| / \Sigma_{k=1, 2 \ldots N} |vp_k - p_{ij}|$ (where $d_k$ is the distance along a k projection line 640A-D and $|vp_k-p_{ij}|$ is the distance from a k vertex 620A-D to the pixel in question). Next, if the calculated $pd_{ij}$ is less than the existing distance from pixel $p_{ij}$ to the nearest face of the building 605, then the pixel $p_{ij}$ is then confirmed to be part of the projected face defined by vertices 630A-D.

In various embodiments, metadata corresponding to the face 610 of the building 605 of the 3D models 600 is assigned to the corresponding projected face. In an example, embodiment, the metadata may include information/data corresponding to a color of the geometric element, a texture of the geometric element, a feature class of the static feature, and/or the like. For example, the projected face defined vertices 630A-D may be assigned metadata that matches and/or is determined based on the metadata corresponding to face 610 defined in the 3D model 600.

FIG. 7 shows an enlarged example of a 2D projection image 700, which is an example of an artificial image of the first, second, or subsequent plurality of artificial images. Artificial image 700 illustrates a projected face 730. In an example embodiment, projected face 730 is a projection of face 610 of 3D model 600 onto the projection plane including the artificial image 700. Artificial image 700 also includes a horizon 720 at an angle as an example embodiment. In various embodiments, horizon 720 may be at positive or negative angles, be flat, be curved, or be crooked with various angles at various sections thereof. Artificial image 700 is divided into sections 710AA-JJ. In an example embodiment, sections 710AA-JJ may be pixels and/or groups of contiguous pixels. For example, artificial image 700 may be a 9×9 pixel image. Each section 710 of artificial image 700 is associated/classified with metadata that indicates one or more attributes assigned to and/or associated with the section 710. In an example embodiment, the one or more attributes includes a class, which may be "building", "road", "sky", or "walkable area". These classes are described as examples, and it is appreciated that other classes may be considered and implemented. Various static features defined in the 3D model 600 are associated with a class. In FIG. 6, building 605 defined in 3D model 600 is classified as a "building". In an example embodiment, each face 610 of building 605 (or other geometric element of a static feature) individually have classes associated with them. For example, each face 610 may have individual classifications as "building". When face 610 is projected onto 2D projection/artificial image 700, each section of the 2D projection/artificial image 700 located within and/or associated with the projected face are classified as the same class associated with face 610. For example, sections 710CE and 710FF may be classified as "building" due to being positioned within the defined projected face 730 and/or being associated with projected face 730. In an example embodiment, a section is classified based on the class of the majority area. For example, section 710BE has a portion of its area corresponding to projected face 730 but may still be classified as "building" due to the area corresponding to projected face 730 being a majority of the area within section 710BE. In another example, section 710BE may remain unclassified. In an example, sections 710AA-JJ are pixels and thus cannot have divided areas within them. In an example embodiment, the sections of an artificial image may be defined based on the projected faces and/or other projected elements of the 3D model 600. In an example embodiment, the sections of an artificial image are defined based on segments defined within the first image (e.g., a real world image to which the artificial image is to be compared). After classifying sections 710 corresponding to a projected face 730, remaining sections are then classified based on the horizon 720. For example, sections 710 corresponding to projected faces 730 or other projected static features of the 3D model 600 may have classes associated therewith (e.g., via corresponding metadata and/or the like), and remaining sections may then each be classified based on the relationship of the section to the horizon 720. For example, sections above the horizon 720, such as section 710FA, are classified as "sky". In another example, sections below the horizon 720, such as section 710JC, may be classified as "road". In various embodiments, other classifications may be assigned to section based on the relationship of the section to the horizon 720.

FIG. 8 illustrates a first real image 800 captured by a mobile apparatus and a plurality of artificial images 700A-F. In certain embodiments, the first real image 800 is captured by an image capturing device that is part of and/or in communication and co-located with the mobile apparatus 20. The first real image 800 captures the surroundings of a mobile apparatus 20 as well as the features present in the surroundings. For example, FIG. 8 shows a first real image 800 of a building 830 in the surroundings of a mobile apparatus 20. In various embodiments, features captured by the first real image 800 may be "road", "walkable area", or any other classification. The first real image 800 may also capture a horizon 820 from the surroundings. The first real image 800 is divided into multiple sections 810. In an example embodiment, the sections 810 in the first real image 800 are similar to the sections 710 of the 2D projection/ artificial image 700. For example, if an artificial image 700 is divided into 9 sections by 9 sections for 81 total sections 710, then the first real image 800 is also divided into 9 sections by 9 sections for 81 total sections 810. For example, if sections 710 of artificial image 700 are pixels, then sections 810 of first real image 800 are also pixels. Similarly, if sectioning of the first real image 800 is done first, then the plurality of artificial images 700 are sectioned in the same manner.

A first real image 800 may be segmented through machine learning algorithms for image segmentation. For example, a first real image 800 may be segmented using a neural networking algorithm for image segmentation. Image segmentation may be done on a first real image 800 to clearly identify features and remove unnecessary objects captured from the surroundings. For example, image segmentation may remove trees, people, and/or cars captured in a first real image 800. The first real image 800 may then be segmented into classes of interest, such as but not limited to the aforementioned "building", "road", and/or "sky". These classes may be identified using machine learning and neural network algorithms. In various embodiments, the color of a feature 830 may be used to identify the class of the feature 830 and/or may be used to segment a first real image 800. After features 830 of the first real image 800 are classified using segmentation, the same classes are then associated with each section 810 of the first real image 800. For example, a section 810 that is associated with and/or located within a feature 830 classified as a building may then be assigned a "building" classification.

FIG. 8 also illustrates a plurality of artificial images 700A-F. Each of the artificial images 700A-F are 2D projection images of 3D models from the surroundings of the mobile apparatus 20. For example, FIG. 8 illustrates a projected face 730 of a building in artificial image 700B. In various embodiments, each of the plurality of artificial images 700 may be 2D projections of the same 3D model but at different positions and/or poses of a pinhole viewpoint/ aperture 660. For example, artificial image 700A and artificial image 700B may be 2D projections of the same building 605 of 3D model 600, but artificial image 700A is a projection from a closer position to the building resulting in the projected face to appear larger and occupy a larger area within the artificial image 700A as compared to artificial image 700B. For example, artificial image 700A and artificial image 700B may comprise a projection of the same static element represented in the 3D model 600, but from different image positions. In another example, artificial images 700B and 700C may be 2D projections of the same 3D building model but at different positions and/or poses, resulting in each horizon in each image to be at different angles and heights. For example, artificial image 700B and artificial image 700C may comprise a projection of the same static element represented in the 3D model 600, but from different image poses.

Once a first real image 800 has been sectioned and attributes of the segment have been determined (e.g., by a segmentation model, in an example embodiment), the first real image 800 is compared with each of a plurality of artificial images 700. This comparison is done on a section-by-section basis. For example, section 810AA in the first real image 800 is compared to a corresponding section 710AA in artificial images 700A-F, respectively. This comparison is evaluated based on the attributes of the corresponding sections in either image. For example, if section 810AA is associated with a "sky" class and section 710AA is also associated with a "sky" class, then section 810AA and section 710AA are considered to be a match. In various embodiments, color of the sections may be used alternatively and/or to further evaluate the comparison. For example, if section 810AA is associated with a "building" class and is substantially grey and section 710AA is associated with a "building" class but is substantially blue, then section 810AA and section 710AA may be considered not to be a match. In another example, if section 810DF is associated with a "building" class and section 710DF is associated with a "sky" class, then the sections may be considered not to match. Once the section-by-section comparison is done throughout an artificial image 700 with a first real image 800, a match score may be calculated and associated with that artificial image 700. In various embodiments, this match score may be an absolute number of matching sections. In other embodiments, the match score for a single artificial image 700 may be a relative number (e.g., fraction/percentage) of matching sections. For example, artificial image 700B may have a high match score due to having a high number of matching sections with the first real image 800. On the other hand, artificial image 700D may have a low match score due to having a low number of matching sections when compared to the first real image 800.

Once match scores have been determined for each of a plurality of artificial images 700, the position and/or pose of the mobile apparatus 20 is then determined based on at least one artificial image (e.g., possibly a set of artificial images) selected from the plurality of artificial images. In an example embodiment, the at least one artificial image is the single artificial image of the plurality of artificial images having the highest match score. In an example embodiment, the at least one artificial image is a set of artificial images that were selected as the artificial images having the highest match scores (e.g., match scores that satisfy a threshold requirement or the k-highest match scores). The location and/or pose of the mobile apparatus 20 is then determined from the image position(s) and/or image pose(s) associated with the at least one artificial image, the image position(s) and/or image pose(s) being and/or related to the positions and/or poses of the aperture 660 used to create each projection for each of the selected set artificial images, respectively. For example, when the at least one artificial image is a single best matching artificial image, the image position and/or image pose of that artificial image is assigned as the location and/or pose of the mobile apparatus 20. In another example, when at least one artificial image is a set of artificial images, the image position and/or image pose associated with each artificial image 700 is weighted according to a corresponding match score and then used to calculated a probabilistic location and/or pose of the mobile apparatus 20. In an example embodiment, an iterative process may be performed in which the at least one artificial image selected and/or identified from the first plurality of images may be used to identify and/or select a second plurality of artificial images from which a second at least one artificial image may be selected based on match scores corresponding to each artificial image of the second plurality of artificial images. The iterative process may continue with subsequent pluralities of artificial images (e.g., a third plurality of artificial images identified and/or selected based on the second at least one artificial image, etc.) until an iteration number and/or convergence criteria is met. The location and/or pose of the mobile apparatus 20 may then be determined based on the image position(s) and/or image pose(s) of the at least one artificial image of the final plurality of artificial images identified as having attributes substantially match attributes of corresponding sections of the first image.

III. Example Apparatus

The mobile apparatus 20 and/or remote apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other mobile computing device. In various embodiments, the mobile apparatus 20 is a mobile computing device that can perform navigation-related functions, such as digital routing and map display. Additionally or alternatively, the remote apparatus 10 may be embodied in other types of computing devices, such as a server, a personal computer, a computer workstation, a laptop computer, a plurality of networked computing devices or the like, that are configured to receive a first image captured by an image capture device 32 of a mobile apparatus 20, store a three-dimensional model and/or artificial images generated based at least in part on the three-dimensional model, generate and/or access artificial images generated based at least in part on the three-dimensional model, identify at least one artificial image having one or more attributes that substantially match the attributes for corresponding sections of the first image, determine a location and/or pose for the mobile apparatus 20 based on the identified at least one artificial image, use the location and/or pose to perform one or more navigation functions, and/or the like. In this regard, FIG. 2A depicts a remote apparatus 10 and FIG. 2B depicts a mobile apparatus 20 of an example embodiment that may be embodied by various computing devices including those identified above. As shown, the remote apparatus 10 of an example embodiment may include, may be associated with or may otherwise be in communication with a processor 12 and a memory device 14 and optionally a communication interface 16 and/or a user interface 18. Similarly, a mobile apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GPS sensor; IMU sensors, accelerometers, gyroscopes, magnetometers, barometers, and/or the like), one or more image capturing devices (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the mobile apparatus to capture a first image comprising representations of one or more features of the mobile apparatus's surroundings, and/or other components configured to perform various operations, procedures, functions or the like described herein. In an example embodiment, the mobile apparatus 20 and/or remote apparatus 10 may comprise a segmentation model. For example, the segmentation model may be trained deep net and/or neural network. For example, network weights and/or parameters for the segmentation model may be provided (e.g., transmitted) to the mobile apparatus 20 by the remote apparatus 10, in an example embodiment.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

As described above, the remote apparatus 10 and/or mobile apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10 and/or mobile apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The remote apparatus 10 and/or the mobile apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10 and/or mobile apparatus 20 of an example embodiment, a navigation system may also include or have access to a geographic database that includes a variety of data (e.g., map information/data) utilized in constructing a route or navigation path, determining the time to traverse the route or navigation path, and/or other navigation functions. In an example embodiment, the geographic database stored map information/data of a three-dimensional and/or 2.5-dimensional map. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the mobile apparatus 20 may be configured to execute computer-executable instructions provided by and/or referred to by a data record. In an example embodiment, the remote apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

In an example embodiment, static feature information/data is stored in association with the map information/data. For example, the geographic database may further comprise a database, library, and/or the like of static feature information/data that is stored in association with the map information/data. For example, in some embodiments, static feature information/data corresponding to static features located within a particular map tile is stored as part of (e.g., as a layer, associated map information/data, and/or the like) of the particular map tile. In an example embodiment, the static feature information/data is three-dimensional information/data. For example, the static feature information/data comprises information/data respectively describing one or more features (e.g., size, shape, color, texture, reflectance, and/or the like of the feature) and the position and orientation of the respective features. In an example embodiment, the static feature information/data is part of the three-dimensional model of the geographic area.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more mobile apparatuses. For example, the remote apparatus 10 may update the geographic database based on a most preferred version map tile as determined from a plurality of responses received from a plurality of mobile apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3, 4, 5, and 6 illustrate flowcharts of apparatuses 10, 20, method, and computer program product according to an example embodiment of the disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present disclosure and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving, by a processor, a first image captured by an image capture device of a mobile apparatus, the first image corresponding to surroundings of the mobile apparatus, wherein a first plurality of artificial images are accessible to the processor, each artificial image of the first plurality of artificial images respectively being a two-dimensional projection of a three-dimensional model from a perspective of an image position and image pose;
determining, by the processor, one or more first image attributes respectively for one or more sections of the first image;
identifying, by the processor, at least one artificial image of the first plurality of artificial images having one or more artificial image attributes that substantially match the one or more first image attributes for corresponding sections of the at least one artificial image and the first image; and
determining, by the processor, a location and/or pose of the mobile apparatus based at least in part on the image position and/or the image pose associated with the identified at least one artificial image.

2. The method of claim 1, further comprising:
receiving an estimated position of the mobile apparatus determined by a location sensor of the mobile apparatus; and
identifying or causing identification of the first plurality of artificial images based on artificial images of the first plurality of artificial images having respective image positions that are within a first distance threshold of the estimated position of the mobile apparatus.

3. The method of claim 1, wherein the first image attribute determined for a section of the first image corresponds to a type of feature in the section of the first image and an artificial image attribute determined for a section of an artificial image of the first plurality of artificial images corresponds to a type of feature in the section of the artificial image.

4. The method of claim 1, wherein the first image attribute determined for a section of the first image corresponds to a color of the section of the first image and an artificial image attribute determined for a section of an artificial image of the first plurality of artificial images corresponds to a color of the section of the artificial image.

5. The method of claim 1, wherein the at least one artificial image comprises a set of artificial images selected from the first plurality of artificial images, and determining a location of the mobile apparatus comprises assigning a weight to each artificial image of the set of artificial images based at least in part on a matching score indicating a level of match between first image attributes and artificial image attributes of the artificial image, and wherein the location of the mobile apparatus is determined based on the image position and/or the image pose and weight associated with each artificial image of the set of artificial images.

6. The method of claim 5, wherein determining a location of the mobile apparatus comprises:
   normalizing the image position and/or the image pose of each artificial image of the set of artificial images based at least in part on the weight assigned to the artificial image; and
   calculating a probabilistic location of the mobile apparatus based on the normalized position and/or pose of each of the selected second plurality of artificial images.

7. The method of claim 1, further comprising:
   accessing a second plurality of artificial images based on the at least one artificial image; and
   determining a second at least one artificial image from the second plurality of artificial images, the second at least one artificial image having artificial image attributes that substantially match the first image attributes for corresponding sections of the second at least one artificial image and the first image.

8. The method of claim 1, wherein the three-dimensional model is a three-dimensional vector model.

9. The method of claim 1, further comprising providing the location and/or pose of the mobile apparatus for use in performing a navigation function.

10. The method of claim 1, further comprising receiving, by the apparatus, radio probe data generated by one or more sensors associated with the mobile apparatus, wherein the location and/or pose of the mobile apparatus is provided as a georeference for the radio probe data.

11. The method of claim 1, further comprising at least one of (a) accessing at least a portion of the first plurality of artificial images from memory, (b) generating at least a portion of the first plurality of artificial images based at least in part on data of the three-dimensional model, (c) or receiving at least a portion of the first plurality of artificial images.

12. An apparatus comprising at least one processor and at least one memory storing computer program code, the at least one memory and the computer program code configured to, with the processor, cause the apparatus to at least:
   receive a first image captured by an image capture device of a mobile apparatus, the first image corresponding to surroundings of the mobile apparatus, wherein a first plurality of artificial images are accessible to the processor, each artificial image of the first plurality of artificial images respectively being a two-dimensional projection of a three-dimensional model from a perspective of an image position and image pose;
   determine one or more first image attributes respectively for one or more sections of the first image;
   identify at least one artificial image of the first plurality of artificial images having one or more artificial image attributes that substantially match the one or more first image attributes for corresponding sections of the at least one artificial image and the first image; and
   determine a location and/or pose of the mobile apparatus based at least in part on the image position and/or the image pose associated with the identified at least one artificial image.

13. The apparatus of claim 12, wherein the at least one memory and the computer program code are further configured to, with the processor, cause the apparatus to at least:
   receive an estimated position of the mobile apparatus determined by a location sensor of the mobile apparatus; and
   identify or cause identification of the first plurality of artificial images based on artificial images of the first plurality of artificial images having respective image positions that are within a first distance threshold of the estimated position of the mobile apparatus.

14. The apparatus of claim 12, wherein the first image attribute determined for a section of the first image corresponds to a type of feature in the section of the first image and an artificial image attribute determined for a section of an artificial image of the first plurality of artificial images corresponds to a type of feature in the section of the artificial image.

15. The apparatus of claim 12, wherein the first image attribute determined for a section of the first image corresponds to a color of the section of the first image and an artificial image attribute determined for a section of an artificial image of the first plurality of artificial images corresponds to a color of the section of the artificial image.

16. The apparatus of claim 12, wherein the at least one artificial image comprises a set of artificial images selected from the first plurality of artificial images, and determining a location of the mobile apparatus comprises assigning a weight to each artificial image of the set of artificial images based at least in part on a matching score indicating a level of match between first image attributes and artificial image attributes of the artificial image, and wherein the location of the mobile apparatus is determined based on the image position and/or the image pose and weight associated with each artificial image of the set of artificial images.

17. The apparatus of claim 16, wherein determining a location of the mobile apparatus comprises:
   normalizing the image position and/or the image pose of each artificial image of the set of artificial images based at least in part on the weight assigned to the artificial image; and
   calculating a probabilistic location of the mobile apparatus based on the normalized position and/or pose of each of the selected second plurality of artificial images.

18. The apparatus of claim 12, wherein the at least one memory and the computer program code are further configured to, with the processor, cause the apparatus to at least:
   access a second plurality of artificial images based on the at least one artificial image; and
   determine a second at least one artificial image from the second plurality of artificial images, the second at least one artificial image having artificial image attributes that substantially match the first image attributes for corresponding sections of the second at least one artificial image and the first image, wherein the location and/or pose of the mobile apparatus is determined based at least in part on the second at least one artificial image.

19. The apparatus of claim 12, wherein the at least one memory and the computer program code are further configured to, with the processor, cause the apparatus to perform at least one of (a) access at least a portion of the first plurality of artificial images from memory, (b) generate at least a portion of the first plurality of artificial images based at least in part on data of the three-dimensional model, (c) or receive at least a portion of the first plurality of artificial images.

20. A computer program product comprising at least one non-transitory computer-readable storage medium having computer-executable program code instructions stored therein, the computer-executable program code instructions comprising program code instructions configured to, when executed by a processor of an apparatus, cause the apparatus to:

receive a first image captured by an image capture device of a mobile apparatus, the first image corresponding to surroundings of the mobile apparatus, wherein a first plurality of artificial images are accessible to the processor, each artificial image of the first plurality of artificial images respectively being a two-dimensional projection of a three-dimensional model from a perspective of an image position and image pose;

determine one or more first image attributes respectively for one or more sections of the first image;

identify at least one artificial image of the first plurality of artificial images having one or more artificial image attributes that substantially match the one or more first image attributes for corresponding sections of the at least one artificial image and the first image; and determine a location and/or pose of the mobile apparatus based at least in part on the image position and/or the image pose associated with the identified at least one artificial image.

* * * * *